United States Patent
Kawada

(10) Patent No.: US 6,661,931 B1
(45) Date of Patent: Dec. 9, 2003

(54) IMAGE PROCESSING METHOD, IMAGE PROCESSING SYSTEM, AND MODIFYING-DATA PRODUCING METHOD

(75) Inventor: Tosuke Kawada, Chiryu (JP)

(73) Assignee: Fuji Machine Mfg. Co., Ltd., Chiryu (JP)

( * ) Notice: Subject to any disclaimer, the term of this patent is extended or adjusted under 35 U.S.C. 154(b) by 575 days.

(21) Appl. No.: 09/723,237

(22) Filed: Nov. 28, 2000

(30) Foreign Application Priority Data

Dec. 3, 1999 (JP) .......................................... 11-344186

(51) Int. Cl.⁷ ................................................. G06K 9/36
(52) U.S. Cl. ...................................... 382/276; 382/294
(58) Field of Search ................................ 382/276, 282, 382/284, 293, 294, 154, 151, 215, 216; 345/426, 427; 348/47, 48, 39

(56) References Cited

U.S. PATENT DOCUMENTS

| | | |
|---|---|---|
| 4,399,554 A | 8/1983 | Perkins, III et al. |
| 4,536,856 A | 8/1985 | Hiroishi |
| 4,688,167 A * | 8/1987 | Agarwal .................... 345/803 |
| 5,136,661 A | 8/1992 | Kobayasi et al. |
| 5,187,754 A | 2/1993 | Currin et al. |
| 5,515,159 A | 5/1996 | Sites et al. |
| 5,586,058 A | 12/1996 | Aloni et al. |
| 5,754,677 A * | 5/1998 | Kawada ..................... 382/141 |
| 5,963,664 A | 10/1999 | Kumar et al. |
| 5,987,164 A | 11/1999 | Szeliski et al. |

FOREIGN PATENT DOCUMENTS

| | | |
|---|---|---|
| EP | 0 351 654 A2 | 1/1990 |
| JP | B2 2824378 | 8/1998 |
| WO | WO 95/34044 | 12/1995 |

OTHER PUBLICATIONS

Qinfen Zheng et al., *A Computational Vision Approach to Image Registration*, IEEE Transactions on Image Processing, Jul. 1993, p. 311–326.

U.S. patent application Ser. No. 09/317,845, Kawada, filed May 25, 1999.

U.S. patent application Ser. No. 09/453,725, Kawada, filed Dec. 3, 1999.

\* cited by examiner

*Primary Examiner*—Phuoc Tran
(74) *Attorney, Agent, or Firm*—Oliff & Berridge, PLC

(57) ABSTRACT

A method of processing batches of object-part-image data representing object-part images which are taken by one or more image-taking devices from parts of an object, respectively, and thereby obtaining one or more optical characteristic values of the object, the object-part images imaging the parts of the object such that a first object-part image images a first part and a second object-part image images a second part adjacent to the first part in the object and includes an overlapping portion imaging a portion of the first part, each of the batches of object-part-image data including optical characteristic values respectively associated with physical positions, and thereby defining a corresponding one of physical screens, the method including the steps of designating at least one virtual position on a virtual screen corresponding to the parts of the object, modifying, based on predetermined modifying data, the at least one virtual position on the virtual screen, and thereby determining at least one physical position corresponding to the at least one virtual position, on one of the physical screens, and obtaining at least one optical characteristic value associated with the at least one physical position on the one physical screen, as at least one optical characteristic value associated with the at least one virtual position on the virtual screen and as the at least one optical characteristic value of the object.

21 Claims, 12 Drawing Sheets

FIG. 10
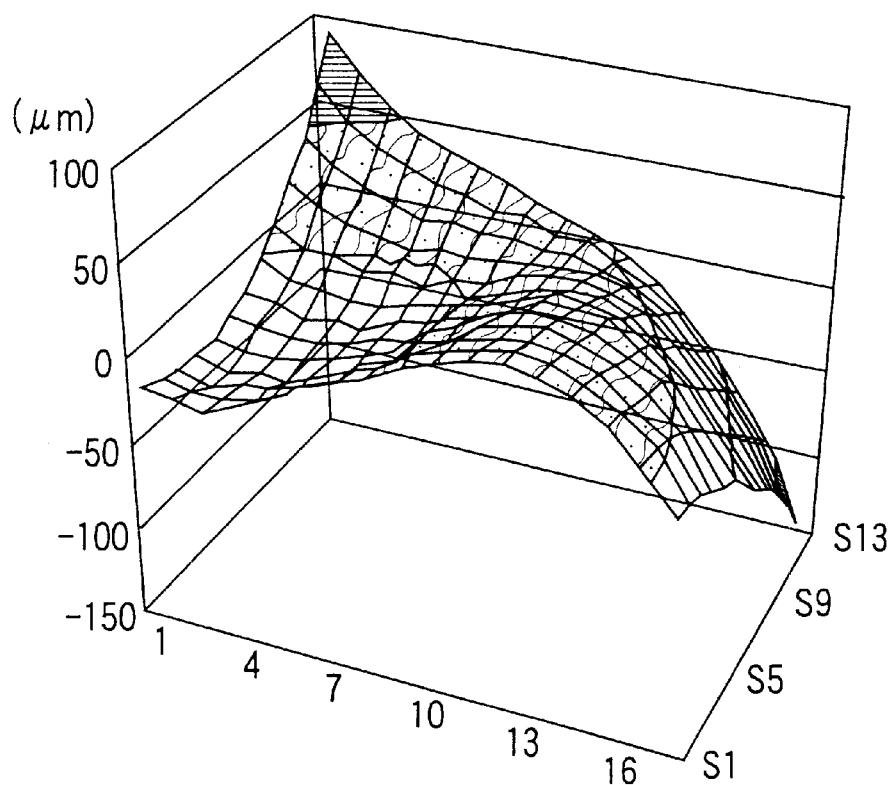
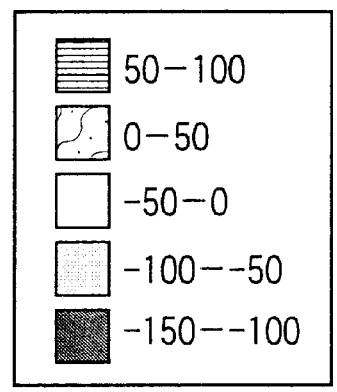

IMAGE PROCESSING METHOD, IMAGE PROCESSING SYSTEM, AND MODIFYING-DATA PRODUCING METHOD

BACKGROUND OF THE INVENTION

1. Field of the Invention

The present invention relates to the art of processing image data representing an image taken by an image-taking device, and particularly to the art of processing a plurality of batches of image data respectively representing a plurality of images which are taken by one or plural image-taking devices from an object a whole image of which cannot be taken at once by the one image-taking device or each of the plural image-taking devices.

2. Discussion of Related Art

There is known an electric-component (EC) mounting apparatus which includes a suction nozzle for holding an EC, and an image-taking device for taking an image of the EC held by the nozzle and thereby inspecting a condition of the EC. The image-taking device may be a CCD (charge-coupled-device) camera including a matrix of CCDs for taking a whole image of the EC. Necessary information can be obtained from the taken image of the EC.

However, when a commonly or widely used CCD camera including a limited number of CCDs or having a limited number of pixels takes, at once, a whole image of a large-size EC having a complex shape, each of the CCDs must take a pixel image of an excessively large portion of the EC, which leads to lowering the degree of resolution of the taken image. Thus, it is difficult to recognize accurately one or more fine portions of the EC, such as its lead wires.

Hence, a camera including a single array of CCDs, i.e., a "line" sensor (hereinafter, referred to as the line-sensor camera) has been used in place of the CCD camera. The line-sensor camera is allowed to have a greater number of CCDs or pixels per unit length, than the CCD camera including the matrix of CCDs. Thus, each of the CCDs of the line-sensor camera has only to take a pixel image of a smaller portion of the large-size EC, which leads to improving the degree of resolution of the taken image. However, the line-sensor camera itself is expensive, and additionally needs a special high-performance light source, which leads to increasing the overall cost of the EC mounting apparatus which employs the line-sensor camera. Moreover, the line-sensor camera needs a longer time to take the whole image of the EC.

In this background, there has been proposed another method using the CCD camera. In this method, as shown in FIG. 14, respective images of a plurality of portions or parts (i.e., four corners) 202 of a large-size EC 200 as an object are sequentially taken by a single CCD camera, or are simultaneously taken by a plurality of (i.e., four) CCD cameras, and a plurality of batches of part-image data representing the respective images of the plurality of parts 202 of the EC 200 are obtained. First position data representing respective positions of the four parts 202 in the EC 202 are obtained from the batches of part-image data, and second position data representing a position of the large-size EC 202 as a whole are obtained from the first position data.

However, in the above method in which the plurality of batches of part-image data are obtained by one or more CCD cameras, a whole or complete image of the large-size EC 200 is not taken. Therefore, the prior method cannot inspect the EC 200 as a whole.

It may be possible to obtain a whole image of the large-size EC 200 by first taking, with one or more CCD cameras, a plurality of part images from a plurality of parts of the EC 200 and then connecting the taken part images to each other while taking into account respective relative positions of the CCD camera or cameras relative to the EC at respective times when the part images are taken. In fact, however, an image-taking device (e.g., a CCD camera) has a distortion of a lens (e.g., a distortion of a matrix of CCDs) and accordingly an image taken by the image-taking device may have distortions in its peripheral portions, in particular. In addition, physical relative positions of the image-taking device or devices relative to the EC 200 may contain some positional errors from reference or prescribed relative positions. If the part images taken from the EC 200 are connected to each other without taking into account the lens distortion or the positional errors, then it would be difficult to reproduce an accurate, whole image of the EC 200 because of the distortion and the errors.

Though the above discussion relates to the art of taking and processing images of ECs, the above problems may occur to not only the ECs but also other sorts of objects (e.g., connectors).

SUMMARY OF THE INVENTION

The present invention provides an image processing method, an image processing system, and a modifying-data producing method which have one or more of the following technical features that are described below in respective paragraphs given parenthesized sequential numbers (1) to (21). Any technical feature that includes another technical feature shall do so by referring, at the beginning, to the parenthesized sequential number given to the latter feature. However, the following technical features and the appropriate combinations thereof are just examples to which the present invention is by no means limited. In addition, in the case where one technical feature recites a plurality of items, it is not essentially required that all of those items be simultaneously employed. That is, it is possible to select and employ only a portion (one, two, . . . , but not all) of those items.

(1) According to a first feature of the present invention, there is provided a method of processing a plurality of batches of object-part-image data representing a plurality of object-part images which are taken by at least one image-taking device from a plurality of parts of an object, respectively, and thereby obtaining at least one optical characteristic value of the object, the object-part images imaging the parts of the object such that at least one first object-part image images at least one first part and at least one second object-part image images at least one second part adjacent to the at least one first part in the object and includes at least one overlapping portion imaging a portion of the at least one first part, each of the plurality of batches of object-part-image data comprising a plurality of optical characteristic values respectively associated with a plurality of physical positions, and thereby defining a corresponding one of a plurality of physical screens, the method comprising the steps of designating at least one virtual position on a virtual screen corresponding to the parts of the object, modifying, based on predetermined modifying data, the at least one virtual position on the virtual screen, and thereby determining at least one physical position corresponding to the at least one virtual position, on one of the physical screens, and obtaining at least one optical characteristic value associated with the at least one physical position on the one physical screen, as at least one optical characteristic value associated with the at least one virtual position on the virtual screen and as the at least one optical characteristic value of the object. At least one first part of the object may belong to a first column of a matrix of parts of the object, and at least one second part of the object may belong to a second column of the matrix that is adjacent to the first column in the matrix.

In the present image processing method, a plurality of object-part images are taken from a plurality of parts of an object, and a condition of the object as a whole may be obtained based on a plurality of batches of object-part images representing the taken object-part images, and the modifying data. A virtual position, designated on a virtual screen, where an optical characteristic value of the object is to be obtained, is modified to a physical position corresponding to the virtual position, on an appropriate one of a plurality of physical screens. Even if each of the physical screens may have a distortion and/or there may be a relative-positional error between the object-part images, the modifying data reflecting the distortion and the relative-positional error are used to determine the physical position accurately corresponding to the virtual position on the virtual screen, and an optical characteristic value associated with the physical position is determined as the optical characteristic value associated with the virtual position, that is, as the optical characteristic value of the object. A group of combinations each of which consists of a virtual position and a corresponding optical characteristic value each obtained in this manner, provides, on the virtual screen, a batch of image data representing the object-art images connected to each other such that the connected, integral image is free of the distortion or the relative-positional error.

The present method allows a commonly or widely used image-taking devices to take not only images of a small-size or medium-size EC but also images of a large-size EC, which contributes to reducing the cost needed to carry out the method.

However, it is not essentially needed to reproduce, on the virtual screen, a whole image of the object, but it is possible to reproduce, on the virtual screen, only an integral image of a desired portion of the object. More specifically described, it is possible to designate a portion on the virtual screen and obtain at least one optical characteristic value corresponding to the designated portion. In this case, the amount of processing of the image data is reduced as such, and accordingly the amount of calculations needed to process the image data is likewise reduced. The virtual position designated on the virtual screen may be a position where a "seek" line intersects a boundary line of each part of the object in the corresponding object-part image, i.e., a position of an "edge" point where respective optical characteristic values of respective points on the seek line most greatly change.

The predetermined modifying data may be modifying data which are produced, in advance, by a modifying-data producing method, described later. When the virtual position is modified based on the modifying data and a physical position corresponding to the virtual position is determined, it is possible to either modify a virtual area corresponding to an image-taking element of the image-taking device, on the virtual screen, and thereby determine a physical area on an appropriate one of the physical screens, or modify a virtual set of coordinates indicating an arbitrary virtual point on the virtual screen, and thereby determine a physical set of coordinates indicating a corresponding point on an appropriate one of the physical screens.

The optical characteristic value may be any sort of value which is characteristic of an optical property of the object, such as luminance or hue. Each optical characteristic value may be expressed in terms of binary values or 2 steps, or 256 steps.

(2) According to a second feature of the present invention that includes the first feature (1), the image-taking device includes a plurality of image-taking elements, the each batch of object-part-image data comprises the plurality of optical characteristic values which are, on the corresponding physical screen, associated with respective physical pixel areas corresponding to the plurality of image-taking elements of the image-taking device, and the modifying data comprise data which associate respective virtual pixel areas on the virtual screen, with the respective physical pixel areas, on each of the physical screens, that correspond to the image-taking elements, the step of modifying the at least one virtual position comprises selecting, from the virtual pixel areas on the virtual screen, at least one virtual pixel area including the at least one virtual position, and determining, on the one physical screen, at least one physical pixel area corresponding to the at least one virtual pixel area, and the step of obtaining the at least one optical characteristic value associated with the at least one physical position on the one physical screen comprises obtaining at least one optical characteristic value associated with the at least one physical pixel area on the one physical screen, as at least one optical characteristic value associated with the at least one virtual pixel area on the virtual screen.

In the present image-data processing method, the modifying data associate the respective virtual pixel areas on the virtual screen, with the respective physical pixel areas on each of the physical screen, and the optical characteristic value associated with the physical position on one physical screen is obtained as the optical characteristic value associated with the physical pixel area on the one physical screen. That is, all positions included in each virtual pixel area is associated with the optical characteristic value associated with the physical pixel area corresponding to the each virtual pixel area. Therefore, the degree of resolution on the virtual screen is limited by the size of each physical pixel area. However, in the present method, since a physical pixel area corresponding to a virtual pixel area on the virtual screen is known in advance, the amount of calculations needed to determine a modifying amount to modify a virtual pixel area on the virtual screen may be less than that needed to determine a modifying amount to modify an arbitrary virtual position on the virtual screen. As far as the present feature is concerned, the respective areas of the virtual pixel areas corresponding to the physical pixel areas on the physical screens are equal to each other.

(3) According to a third feature of the present invention that includes the first feature (1), the modifying data comprise a plurality of modifying tables each of which associates a plurality of prescribed sets of coordinates prescribed on the virtual screen, with a plurality of modifying amounts to modify the plurality of prescribed sets of coordinates and thereby determine, on a corresponding one of the physical screens, a plurality of physical sets of coordinates corresponding to the plurality of prescribed sets of coordinates, and the step of modifying the at least one virtual position comprises determining, based on one of the modifying tables that corresponds to the one physical screen, at least one modifying amount corresponding to at least one virtual set of coordinates indicating the at least one virtual position on the virtual screen, and determining, based on the at least one modifying amount, at least one physical set of coordinates corresponding to the at least one virtual set of coordinates, on the one physical screen.

In the image-data processing method according to the second feature (2), a modifying amount is not determined for an arbitrary virtual position, but for a virtual pixel area corresponding to an image-taking element of the image-taking device. In contrast, in the present image-data processing method, it may be assumed that modifying amounts are continuous values and, on this assumption, a modifying amount for an arbitrary virtual set of coordinates is obtained based on a plurality of modifying amounts for a plurality of prescribed sets of coordinates. In the present method, no virtual or physical pixel areas are used as unit, but a modifying amount for an arbitrary virtual set of coordinates is obtained, which leads to improving the accuracy with which the optical characteristic value of the object is obtained. The manner in which a modifying amount for an arbitrary virtual set of coordinates is obtained may be such that a modifying amount is determined based on a modifying amount for the prescribed set of coordinates that is the nearest to the virtual set of coordinates; or such that a modifying amount is determined based on respective modifying amounts for a plurality of neighboring prescribed sets of coordinates that neighbor the virtual set of coordinates, as will described in the following feature (4), below. It is preferred that the prescribed sets of coordinates be uniformly located or distributed on the virtual screen.

(4) According to a fourth feature of the present invention that includes the third feature (3), the step of determining the at least one modifying amount comprises determining the at least one modifying amount corresponding to the at least one virtual set of coordinates, based on the one modifying table which associates a plurality of neighboring prescribed sets of coordinates neighboring the at least one virtual set of coordinates on the virtual screen, with a plurality of modifying amounts to modify the plurality of neighboring prescribed sets of coordinates and thereby determine, on the one physical screen, a plurality of physical sets of coordinates corresponding to the plurality of neighboring prescribed sets of coordinates.

In the present image-data processing method, a modifying amount for an arbitrary virtual set of coordinates is determined based on respective modifying amounts for a plurality of neighboring prescribed sets of coordinates that neighbor the virtual set of coordinates. The thus determined modifying amount enjoys a higher reliability than that determined based on the modifying amount for the prescribed set of coordinates that is the nearest to the virtual set of coordinates.

The total number of the neighboring prescribed sets of coordinates that are selected to determine a modifying amount for one virtual set of coordinates may not be limited. For example, in the case where a modifying amount for an arbitrary virtual set of coordinates is determined based on respective modifying amounts for four neighboring prescribed sets of coordinates that neighbor the virtual set of coordinates, the amount of calculations needed to determine the modifying amount for the arbitrary virtual set of coordinates is not increased so much, while the reliability of the modifying amount determined is improved to a satisfactory level.

(5) According to a fifth feature of the present invention that includes the third or fourth feature (3) or (4), the image-taking device includes a plurality of image-taking elements, and the each batch of object-part-image data comprises the plurality of optical characteristic values which are, on the corresponding physical screen, associated with respective physical pixel areas corresponding to the plurality of image-taking elements of the image-taking device, and the step of obtaining the at least one optical characteristic value associated with the at least one physical position on the one physical screen comprises obtaining at least one optical characteristic value associated with at least one physical pixel area including the at least one physical set of coordinates corresponding to the at least one virtual set of coordinates.

In the present image-data processing method, an optical characteristic value is determined on an image-taking-element basis, i.e., on a pixel-area basis. Therefore, the degree of resolution on the virtual screen is limited by the size of the pixel areas, like in the method according to the second feature (2). However, the amount of calculations can be reduced as such.

(6) According to a sixth feature of the present invention that includes the third or fourth feature (3) or (4), the image-taking device includes a plurality of image-taking elements, and the each batch of object-part-image data comprises the plurality of optical characteristic values which are, on the corresponding physical screen, associated with respective physical-pixel-related sets of coordinates indicating respective positions, in the image-taking device, of respective points representing the plurality of image-taking elements, and the step of obtaining the at least one optical characteristic value associated with the at least one physical position on the one physical screen comprises determining at least one optical characteristic value associated with the at least one physical set of coordinates corresponding to the at least one virtual set of coordinates, based on the physical-pixel-related sets of coordinates, and the optical characteristic values associated therewith, of the one physical screen.

In the present image-data processing method according to the above, fifth feature (5), an optical characteristic value is determined not on a physical-coordinate basis but on an image-taking-element or pixel-area basis. In contrast, in the present image-data processing method, a physical set of coordinates corresponding to an arbitrary virtual set of coordinates is determined and, on the assumption that optical characteristic values are continuous on the physical screen including the determined physical set of coordinates, an optical characteristic value corresponding to the determined physical set of coordinates is determined. In the present method, the respective points representing the image-taking elements (hereinafter, reference to as the "pixel-area-representing points"; and the respective positions of the pixel-area-representing points will be referred to as the "pixel-area positions") may be determined at anywhere in the corresponding pixel areas on each physical screen, preferably at the respective centers of the pixel areas. It is rational that the optical characteristic value obtained as the average of all possible values in each pixel area by the is corresponding image-taking element is regarded as the optical characteristic value obtained at the center of the each pixel area. Since the present method assures that an optical characteristic value associated with an arbitrary physical set of coordinates is obtained, it can enjoy a higher accuracy of processing of image data than the method in which image data are processed on a pixel-area basis. It is preferred that the an optical characteristic value associated with a physical set of coordinates be determined based on respective positions of a plurality of pixel-area-representing points neighboring the physical set of coordinates and a plurality of optical characteristic values associated with those positions, as recited in the following seventh feature (7). (7) According to a seventh feature of the present invention that includes the sixth feature (6), the step of determining the at least one optical characteristic value associated with the at least one physical set of coordinates comprises determining the at least one optical characteristic value associated with the at least one physical set of coordinates, based on a plurality of neighboring physical-pixel-related sets of coordinates neighboring the at least one physical set of coordinates, and a plurality of optical characteristic values associated with the plurality of neighboring physical-pixel-related sets of coordinates, of the one physical screen.

In the present method, since an optical characteristic value associated with a physical set of coordinates is determined based on a plurality of neighboring physical-pixel-related sets of coordinates neighboring the physical set of coordinates and a plurality of optical characteristic values associated with the plurality of neighboring physical-pixel-related sets of coordinates, the accuracy of determination of optical characteristic value or values is improved. In the case where an optical characteristic value associated with a physical set of coordinates is determined by proportional calculations of four optical characteristic values respectively associated with four neighboring physical-pixel-related sets of coordinates, the accuracy can be improved without increasing the amount of calculations so much. However, it is possible to determine an optical characteristic value associated with a physical set of coordinates, as a value which is determined on a free curved surface based on nine optical characteristic values respectively associated with nine neighboring physical-pixel-related sets of coordinates.

(8) According to an eighth feature of the present invention that includes any one of the first to seventh features (1) to (7), the image-data processing method further comprises the step of determining, in advance, the one of the physical screens that is to be used to obtain the at least one optical characteristic value associated with the at least one physical position corresponding to the at least one virtual position.

Regarding the overlapping portion of the second object-part image, a physical position may be determined on not only the second physical screen corresponding to the second object-part image but also the first physical screen corresponding to the first object-part image. Since a physical position is determined by modifying a virtual position based on the modifying data, a substantially equal optical characteristic value is obtained by determining the physical position on either the first or second physical screen. The present image-data processing method determines, in advance, which one of the physical screens is used to obtain an optical characteristic value associated with a physical position corresponding to each virtual position designated on the virtual screen. A boundary line is provided in an overlapping portion of the first and second physical screens that corresponds to the overlapping portion of the second object-part image, for example, is defined by a straight line which perpendicularly and equally divides a straight line segment connecting the respective centers of the first and second object-part images.

(9) According to a ninth feature of the present invention that includes any one of the first to eighth features (1) to (8), the image-taking device includes a plurality of image-taking elements, and the overlapping portion of the second object-part image has a width which is not smaller than twice a width of a physical pixel area corresponding to each of the image-taking elements.

The overlapping portion must not include a position for which an optical characteristic value cannot be obtained from either the first or second physical screen. Hence, it is desirable that the overlapping portion have a width or dimension not smaller than twice a width or dimension of a physical pixel area corresponding to each of the image-taking elements. However, the size of "twice" is selected on the assumption that an optical characteristic value associated with a physical set of coordinates is determined based on four optical characteristic values respectively associated with four pixel-area-related sets of coordinates neighboring the physical set of coordinates. Therefore, in the case where an optical characteristic value associated with a physical set of coordinates is determined based on more optical characteristic values respectively associated with more pixel-area-related sets of coordinates neighboring the physical set of coordinates, the overlapping portion needs to have a greater width. In the latter case, it is preferred that the width of the overlapping portion be about ten times greater than that of each pixel area. Meanwhile, in the case where the modifying data are produced using a standard substrate having a plurality of reference marks regularly provided thereon, as will be described later, it is preferred that the width of the overlapping portion be sufficiently greater than a width of each reference mark.

(10) According to a tenth feature of the present invention that includes any one of the first to ninth features (1) to (9), the object comprises a connector.

The present image-data processing method may be carried out for an EC mounting apparatus which mounts a connector as an object on a circuit substrate. In this case, part images of the connector are taken and, based on image data representing the part images, a condition of the connector may be inspected.

(11) According to an eleventh feature of the present invention, there is provided an image-data processing system, at least one image-taking device which takes a plurality of object-part images from a plurality of parts of an object, respectively, the object-part images imaging the parts of the object such that at least one first object-part image images at least one first part and at least one second object-part image images at least one second part adjacent to the at least one first part and includes at least one overlapping portion imaging a portion of the at least one first part; an object-part-image-data memory which stores a plurality of batches of object-part-image data representing the plurality of object-part images taken by the image-taking device, each of the batches of object-part-image data comprising a plurality of optical characteristic values respectively associated with a plurality of physical positions, and thereby defining a corresponding one of a plurality of physical screens; a modifying-data memory which stores predetermined modifying data; and a virtual-data producing device which modifies, based on the modifying data, at least one virtual position on a virtual screen corresponding to the parts of the object, and thereby determines at least one physical position corresponding to the at least one virtual position, on one of the physical screens, and which produces virtual data comprising the at least one virtual position which is, on the virtual screen, associated with at least one optical characteristic value which is, on the one physical screen, associated with the at least one physical position.

The present image-data processing system may carry out the image-data processing method according to the first feature (1). The physical position may be a physical pixel area corresponding to each of a plurality of image-taking elements of the image-taking device, and the virtual position may be a virtual pixel area corresponding to the physical pixel area. Alternatively, the virtual position may be an arbitary virtual position on the virtual screen, and the physical position may be a physical position corresponding to the arbitrary virtual position, on one of the physical screens, as will be described later.

The present system may employ any one of the first to tenth features (1) to (10).

(12) According to a twelfth feature of the present invention that includes the eleventh feature (11), the virtual-data producing device modifies, based on the modifying data, at least one virtual set of coordinates representing the at least one virtual position, and thereby determines at least one physical set of coordinates corresponding the at least one virtual set of coordinates, and produces the virtual data comprising the at least one virtual set of coordinates which is, on the virtual screen, associated with the at least one optical characteristic value which is, on the one physical screen, associated with the at least one physical set of coordinates.

Like the image-data processing method according to the third feature (3), the present image-data processing system determines a physical set of coordinates corresponding to an arbitrary virtual set of coordinates, and obtains an optical characteristic value associated with the physical set of coordinates. Thus, the present system can obtain a very accurate optical characteristic value of the object. An optical characteristic value associated with a physical set of coordinates may be determined based on an optical characteristic value associated with a physical pixel area including the physical set of coordinates, or based on at least one (preferably, plural) optical characteristic value associated with at least one pixel-area-related set of coordinates neighboring the physical set of coordinates. An optical characteristic value associated with a physical set of coordinates can be more accurately determined based on plural optical characteristic values associated with plural neighboring pixel-area-related sets of coordinates, than a single optical characteristic value associated with a single neighboring pixel-area-related set of coordinates.

(13) According to a thirteenth feature of the present invention, there is provided a method of predetermining the modifying data recited in the eleventh or twelfth feature (11) or (12), comprising the steps of taking, with the at least one image-taking device, at least two substrate-part images from at least two parts of a substrate that correspond to the at least one first part and the at least one second part of the object, the substrate having a plurality of reference marks which are regularly provided on a surface thereof, obtaining at least two batches of substrate-part-image data representing the at least two substrate-part images, respectively, the at least two substrate-part images imaging the at least two parts of the substrate such that at least one first substrate-part image images at least one first part of the substrate and at least one second substrate-part image images at least one second part of the substrate adjacent to the at least one first part in the substrate and includes at least one overlapping portion imaging a portion of the at least one first part of the substrate, each of the at least two batches of substrate-part-image data defining a corresponding one of a plurality of physical screens, and producing, based the on at least two physical screens, and a virtual screen corresponding to the at least two parts of the substrate and having, thereon, respective prescribed positions of the reference marks of the substrate, the modifying data to modify each of respective physical positions of the reference marks on the at least two physical screens so as to coincide with a corresponding one of the prescribed positions of the reference marks on the virtual screen.

The present modifying-data predetermining or producing method can predetermine or produce the modifying data which can modify both the positional errors of the reference marks caused by the distortion of the substrate-part images taken by the image-taking device, and the relative-position errors and relative-angular-phase errors of the image-taking device when the image-taking device takes the substrate-part images. If there are no (or negligible, if any) image distortion, relative-position errors, or relative-angular-phase errors, then each of the respective physical positions of the reference marks on the physical screens should coincide with a corresponding one of the prescribed positions of the reference marks on the virtual screen. However, if there are, the present method produces the modifying data which is used to modify each of the respective physical positions of the reference marks on the physical screens so as to coincide with a corresponding one of the prescribed positions of the reference marks on the virtual screen. The correction data may be so produced as to be continuous within a range corresponding to each of the physical screens, but not continuous at a boundary between the two physical screens corresponding to the first and second substrate-part images.

The modifying data are so predetermined or produced as to be used in the image-data processing method according to any one of the first to tenth features (1) to (10), or in the image-data processing system according to the eleventh or twelfth feature (11) or (12). In other words, as the image-data processing method or system takes the object-part images from the parts of the object, the modifying-data producing method takes the substrate-part images from the parts of the standard substrate, such that the dimensions of each of the first and second parts of the substrate are equal to those of each of the first and second parts of the object, the distance between the first and second parts of the substrate is equal to that of the first and second parts of the object, and the width of the overlapping portion of the second substrate-part image is equal to that of the second object-part image.

However, the standard substrate having the reference marks is not necessarily required to have such dimensions that are not smaller than the total dimensions of all the parts of the object from which the image-taking device takes the object-part images. If the substrate has those dimensions, then the number of substrate-part images that is needed to produce the modifying data corresponding to all of the parts of the object can be advantageously obtained by moving at least one of the substrate and the image-taking device relative to the other, by the corresponding number of times, and operating the image-taking device to take the respective images of the parts of the substrate. However, if the substrate has such dimensions that correspond to the total dimensions of at least two parts of the object, then it is possible to obtain substrate-part images needed to produce the modifying data corresponding to three or more parts of the object. For example, in the case where the object consists of three parts, a standard substrate having dimensions somewhat larger than the total dimensions of two parts of the object, is employed, first, respective images of two parts of the substrate that correspond to a first pair of adjacent parts of the object are taken, so that first modifying data are produced based on the thus taken two substrate-part images, and then the substrate is moved to a position where the two parts of the substrate are opposed to one of the above two parts, and the remaining third part, of the object, that is, a second pair of adjacent parts of the object, so that respective images of the two parts of the substrate are taken and second modifying data are produced based on the thus taken two substrate-part images. The first modifying data can be used commonly for the first pair of parts of the object, and the second first modifying data can be used commonly to the second pair of parts of the object, but neither of the first and second modifying data can be used commonly for the three parts of the object. However, if one of respective half portions of the first and second modifying data that correspond to the middle one of the three parts of the object is subjected to an appropriate coordinate transformation, then the one half portion of one of the first and second modifying data coincides with the other half portion of the other modifying data; and, if the other half portion of the one modifying data is subjected to the coordinate transformation, then third modifying data which can be used commonly for the three parts of the object, are produced.

It is preferred that the reference marks be uniformly distributed over the entire range of the standard substrate that corresponds to all the parts of the object.

(14) According to a fourteenth feature of the present invention that includes the thirteenth feature (13), the step of producing the modifying data comprises producing the modifying data to modify a physical set of coordinates indicating the each of the respective physical positions of the reference marks on the at least two physical screens so as to coincide with a prescribed set of coordinates indicating the corresponding one of the prescribed positions of the reference marks on the virtual screen.

A physical set of coordinates indicating the physical position of each reference mark may be a physical set of coordinates indicating the center of each reference mark. A known image-processing technique, such as the technique disclosed in U.S. Pat. No. 5,754,677, may be utilized to determine the physical set of coordinates indicating the center of each of the reference marks on the physical screens. According to the technique disclosed in the U.S. patent, it is assumed that optical characteristic values obtained from the substrate-part images are continuous values, and a boundary between the image of each reference mark and its background is determined. Thus, the shape of each reference mark can be accurately recognized.

(15) According to a fifteenth feature of the present invention that includes the fourteenth feature (14), the step of producing the modifying data comprises producing a plurality of prescribed sets of coordinates indicating the prescribed positions of the reference marks on the virtual screen, and a plurality of modifying vectors respectively directed from the plurality of prescribed sets of coordinates to a plurality of physical sets of coordinates indicating the respective physical positions of the reference marks on the at last two physical screens, and producing at least two modifying tables each of which associates at least two prescribed sets of coordinates out of the plurality of prescribed sets of coordinates, with at least two modifying vectors out of the plurality of modifying vectors.

The prescribed sets of coordinates indicating the prescribed positions of the reference marks on the virtual screen correspond to the prescribed sets of coordinates prescribed on the virtual screen recited in the third feature (3), and the modifying vectors correspond to the modifying amounts recited in the third feature (3). The modifying tables are produced for the physical screens, respectively.

(16) According to a sixteenth feature of the present invention that includes any one of the thirteenth to fifteenth features (13) to (15), the step of taking the at least two substrate-part images comprises sequentially taking, with a single image-taking device as the at least one image-taking device, the at least two substrate-part images from the at least two parts of the substrate, and the step of producing the modifying data comprises producing, based on at least one of the at least two modifying tables that corresponds to at least one of the at least two physical screens, image-distortion data representing a distortion of the at least one physical screen relative to the virtual screen, and producing positional-error data representing a positional error of each of the at least two physical screens relative to the virtual screen.

In the case where the single image-taking device takes the substrate-part images from the parts of the standard substrate, the errors caused by the distortion of one or more components of the image-taking device (e.g., a lens or a matrix of CCDs), and the modifying amounts to modify or correct the errors, can be considered as being common to all of the physical screens. Hence, the present modifying-data producing method produces the modifying data including the image-distortion data which can be used commonly to all the physical screens, and the positional-error data representing the positional error of each of the physical screens. Thus, the total amount of the modifying data can be reduced as compared with the case where the modifying tables corresponding to the physical screens include respective batches of image-distortion data.

In addition, since the image-distortion data and the positional-error data can be stored in different areas of a memory, the two sorts of data can be utilized independent of each other. For example, in the case where the position of the image-taking device is changed as the operation of the EC mounting apparatus is advanced, the positional-error data may be changed and used while the image-distortion data are not changed.

(17) According to a seventeenth feature of the present invention that includes the sixteenth feature (16), the step of producing the positional-error data comprises producing, based on the modifying vectors of each of the at least two modifying tables, parallel-position-error data representing a position error of a corresponding one of the at least two physical screens relative to the virtual screen in a direction parallel to the virtual screen, and producing, based on the modifying vectors of the each modifying table, angular-phase-error data representing an angular-phase error of the corresponding one physical screen relative to the virtual screen about an axis line perpendicular to the virtual screen.

(18) According to an eighteenth feature of the present invention that includes the sixteenth feature (16), the step of producing the positional-error data comprises producing, based on at least one error of at least one physical set of coordinates indicating the physical position of at least one representative reference mark of the reference marks on the each physical screen, relative to at least one prescribed set of coordinates indicating the prescribed position of the at least one representative reference mark on the virtual screen, parallel-position-error data representing a position error of the each physical screen relative to the virtual screen in a direction parallel to the virtual screen, and producing, based on the at least one error of the at least one physical set of coordinates indicating the physical position of the at least one representative reference mark on the each physical screen, relative to the at least one prescribed set of coordinates indicating the prescribed position of the at least one representative reference mark on the virtual screen, angular-phase-error data representing an angular-phase error of the each physical screen relative to the virtual screen about an axis line perpendicular to the virtual screen.

In the present modifying-data producing method, the parallel-position-error data and the angular-phase-error data can be produced by selecting, as the representative reference mark, a reference mark located in a portion (e.g., a central portion) of each of the physical screens where the each physical screen is less influenced by the image distortion. Thus, the total amount of calculations needed to produce the modifying data can Into be reduced as compared with the method according to the above, eighteenth feature (18).

(19) According to a nineteenth feature of the present invention that includes the sixteenth to eighteenth features (16) to (18), the step of producing the positional-error data further comprises determining, based on the positional-error data and at least one prescribed offset amount prescribed for the at least two physical screens, a physical offset amount between the at least two physical screens.

The physical offset amount may be determined for each pair of adjacent physical screens of the at least two physical screens, based on a corresponding pair of modifying tables of the at least two modifying tables. Alternatively, the physical offset amount may be determined for an appropriate one pair of adjacent physical screens of the at least two physical screens and may be regarded as being equal to that for each other pair of adjacent physical screens.

(20) According to a twentieth feature of the present invention that includes the nineteenth feature (19), the at least two physical screens comprise a single main physical screen and at least one auxiliary physical screen, and wherein the step of determining the physical offset amount comprises determining a relative positional error of the at least one auxiliary physical screen relative to the main physical screen.

The present modifying-data producing method determines the relative positional error of the auxiliary physical screen relative to the main physical screen. Therefore, the modifying table corresponding to the main physical screen may include the image-distortion data, and the modifying table corresponding to the auxiliary physical screen may not include the image-distortion data.

(21) According to a twenty-first feature of the present invention that includes the twentieth feature (20), the step of obtaining the at least two batches of substrate-part-image data comprises obtaining at least three batches of substrate-part-image data representing at least three substrate-part images taken from at least three parts of the substrate, and defining at least three physical screens, respectively, and the at least three physical screens comprise the main physical screen representing an middle one of the at least three substrate-part images taken from a middle one of the at least three parts of the substrate.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which:

FIG. 10 is a graph showing a distortion of a physical screen that is obtained by the EC mounting system;

DETAIL DESCRIPTION OF PREFERRED EMBODIMENT

Figure 1:
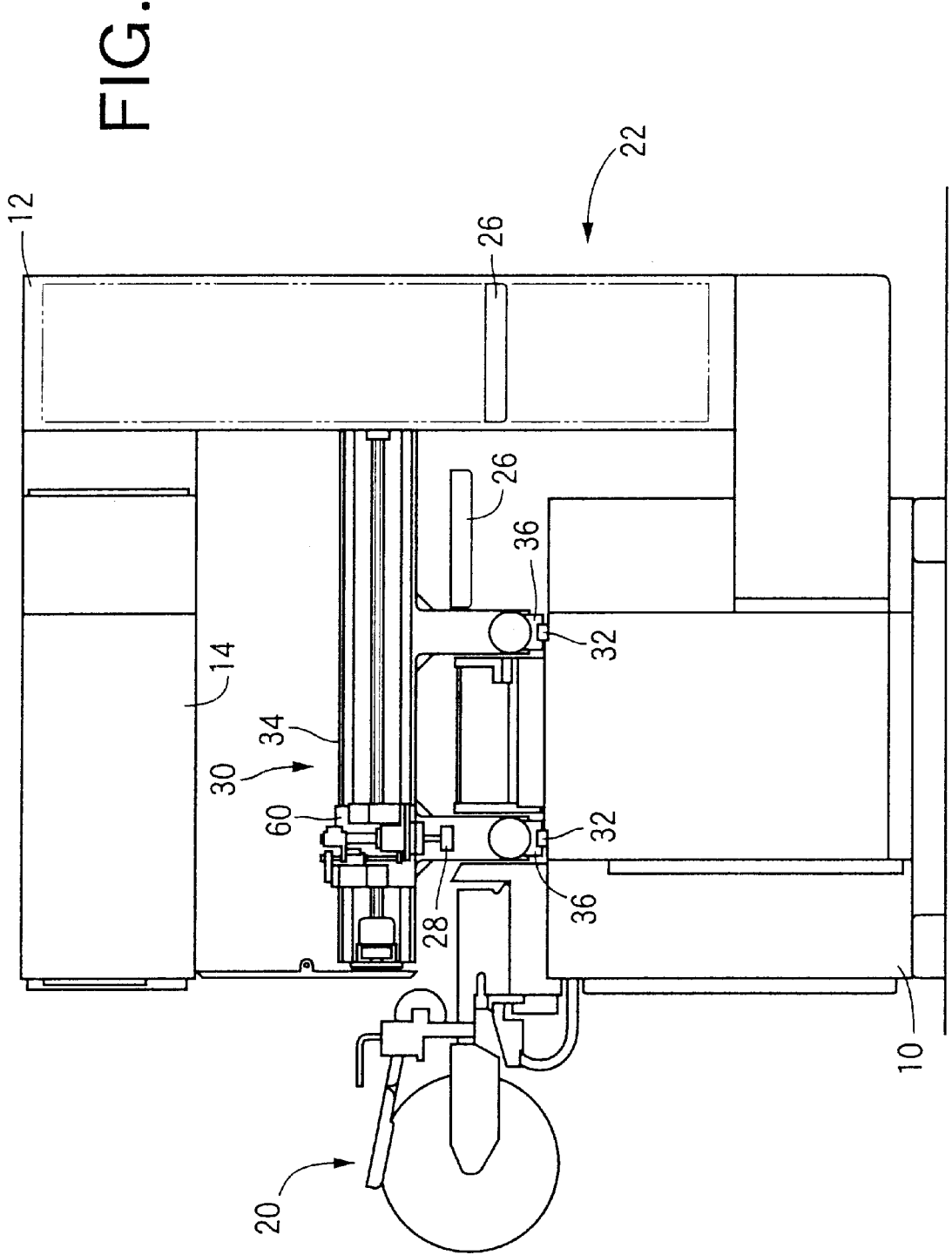
FIG. 1 is a side elevation view of an electric-component (EC) mounting system to which the present invention is applied.
Figure 2:
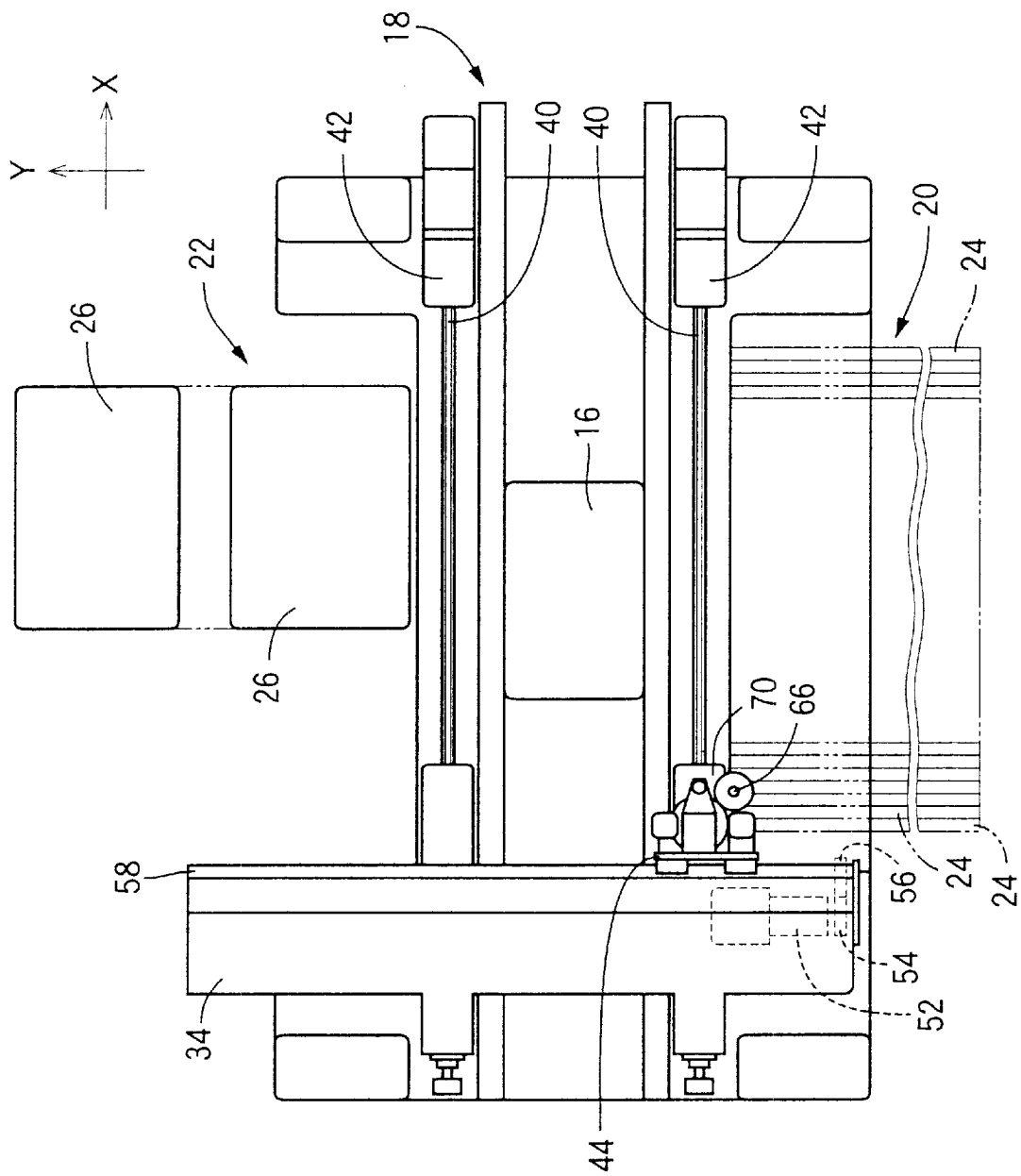
FIG. 2 is a plan view of the EC mounting system.

An electric-component (EC) mounting system to which the present invention is applied is shown in FIGS. 1 and 2. The present EC mounting system has the same basic construction as that of the system disclosed in Japanese Patent No. 2,824,378. First, a general construction of the EC mounting system is briefly described and then, only relevant portions of the same are described in detail.

In FIG. 1, reference numeral 10 designates a base, on which a plurality of columns 12 stand. A stationary frame 14 is fixed to the columns 12, and supports an operation panel, etc. As shown in FIG. 2, on the bed 10, there is also provided a board conveyor 18 which conveys a printed board 16 as a circuit substrate in an X-axis direction as shown in FIG. 2. The term "printed board" is used to refer both a printed "wiring" board on which no ECs have been mounted, and a printed "circuit" board on which ECs have been mounted. The printed board 16 which is conveyed by the board conveyor 18 is positioned and supported at a prescribed position by a board positioning and supporting device (not shown).

A feeder-type EC supplying device 20 and a tray-type EC supplying device 22 are provided on both sides of the board conveyor 18 in a Y-axis direction perpendicular to the X-axis direction on a horizontal plane. The feeder-type EC supplying device 20 includes a number of feeders 24 which are arranged in the X-axis direction. Each feeder 24 feeds an EC carrier tape. The EC carrier tape includes an EC accommodating tape which has a number of EC accommodating pockets arranged at a regular interval of distance in a lengthwise direction thereof and carries a number of ECs accommodated in the pockets, respectively; and a cover tape which is adhered to the accommodating tape to close respective openings of the pockets thereof, so that at the time of feeding of the EC carrier tape, the ECs are prevented from jumping out of the pockets. Each feeder 24 feeds the EC carrier tape at a predetermined pitch in the Y-axis direction, while peeling the cover tape from the EC accommodating tape. Thus, each EC is fed to an EC-supply portion of each feeder 24 as an EC-supply position of the feeder-type EC supplying device 20.

The tray-type EC supplying device 22 includes a number of trays each of which holds a plurality of ECs. As shown in FIG. 2, the supplying device 24 includes a number of tray accommodating boxes 26 each of which accommodates a plurality of trays. The tray accommodating boxes 26 are supported by respective support members (not shown), and are sequentially moved to a prescribed EC-supply position by an elevating and lowering device and a moving device (both not shown) which are provided in one of the columns 12. The EC-supply position is prescribed at a position which is nearer to the board conveyor 18 than a waiting position where the boxes 26 wait in a vertically stacked state. Above one box 26 being positioned at the. EC-supply position, a predetermined head-movement space is provided for a mounting head 60, described later, to move and take ECs from the trays of the one box 26. One box 26 which accommodates one tray storing one or more ECs to be supplied next, is moved in a horizontal position from the waiting position to the EC-supply position where the one box 26 supplies the EC or ECs. After the one box 26 has finished supplying the EC or is ECs, the one box 26 is returned horizontally to the waiting position, before the next box 26 is moved to the EC-supply position, and then is a retracted to a waiting space provided above the waiting position.

Large-size ECs 28 (FIG. 1) which are supplied by the feeder-type EC supplying device 20 and the tray-type EC supplying device 22 are mounted on the printed board 16 by an EC mounting device 30 which is provided on the bed 10. As shown in FIG. 1, two guide rails 32 which extend in the X-axis direction are provided, on the bed 10, on both sides of the board conveyor 18 in the Y-axis direction, and an X-axis slide 34 fits on the guide rails 32 via respective guide blocks 26 such that the X-axis slide 34 is movable in the X-axis direction.

Figure 3:
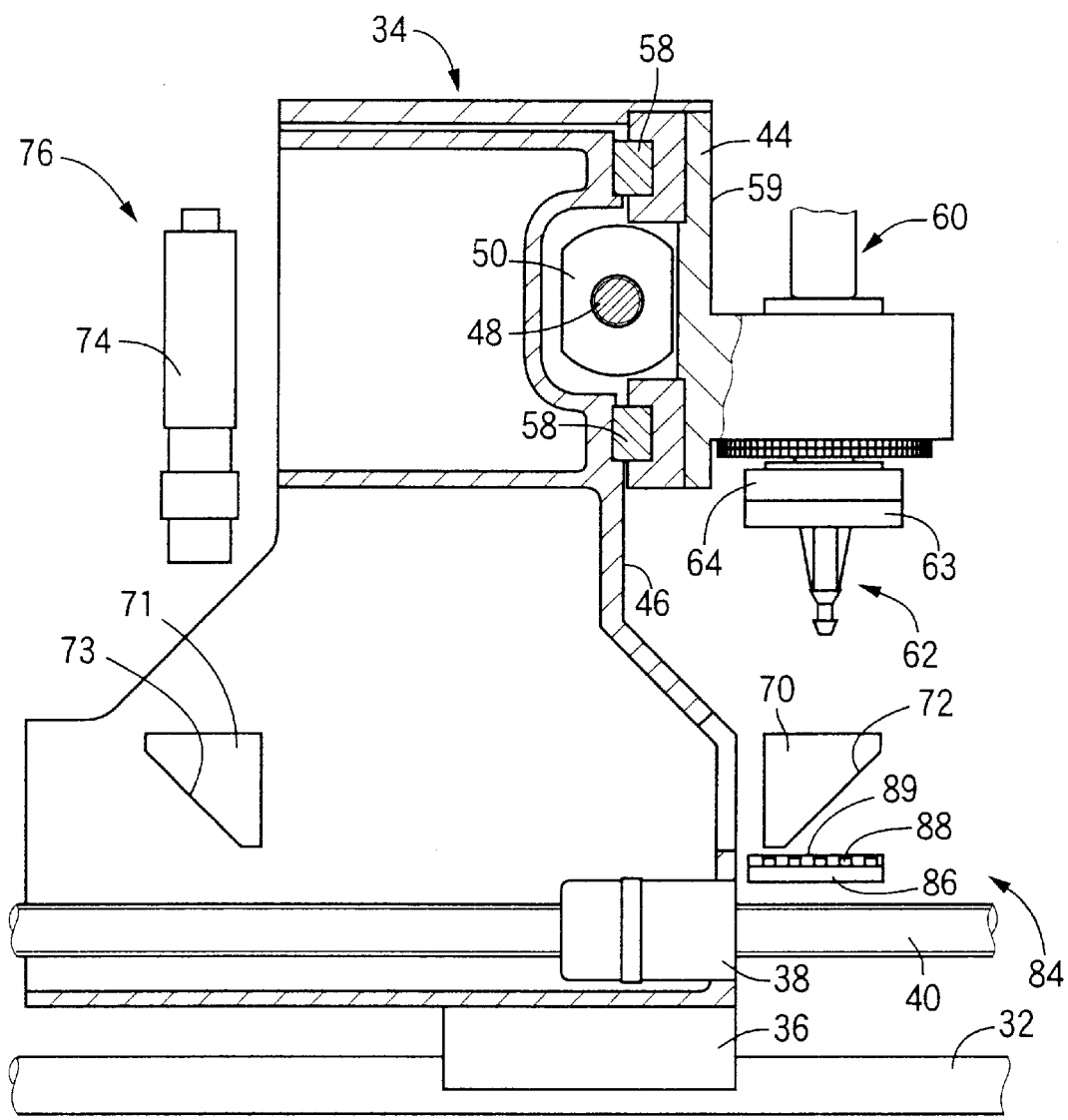
FIG. 3 is an enlarged, cross-sectioned, side elevation view of a mounting head of the EC mounting system.

As shown in FIG. 2, the X-axis slide 34 has a length extending from the feeder-type EC supplying device 20 to the tray-type device 22 over the board conveyor 18, and two nuts 38 (only one nut 28 is shown in FIG. 3) are fixed to the X-axis slide 34. The two nuts 38 are threadedly engaged with two ball screws 40, respectively. When the two ball screws 40 are rotated in synchronism with each other by two X-axis servomotors 42, respectively, the X-axis slide 34 is moved in the X-axis direction.

On the X-axis slide 34, a Y-axis slide 44 is provided such that the Y-axis slide 44 is movable in the Y-axis direction perpendicular to the X-axis direction on the horizontal plane. As shown in FIG. 3, the X-axis slide 34 has a vertical surface 46 to which a ball screw 48 which extends in the Y-axis direction is fixed, and a nut 50 fixed to the Y-axis slide 44 is threadedly engaged with the ball screw 48. When the ball screw 48 is rotated by a Y-axis servomotor 52 (FIG. 2) via gears 54, 56, the Y-axis slide 44 is moved in the Y-axis direction by being guided by a pair of guide rails 58.

As shown in FIG. 3, the Y-axis slide 44 has a vertical surface 59 which supports a mounting head 60 such that the head 60 is not movable relative to the Y-axis slide 44. The mounting head 60 includes a nozzle holder 64 which is vertically movable, and a suction nozzle 62 is attached to the holder 64 such that the nozzle 62 is detachable from the holder 64. The suction nozzle 62 applies a negative air pressure to the EC 28 and thereby holds the same 28. The suction nozzle 62 includes a back light 63 which provides a light background of the EC 28 held thereby. The mounting head 60 additionally includes a fiducial-mark (F-mark) camera 66 which takes respective images of fiducial marks (F-marks) as positioning reference marks that are provided on the printed board 16. The F-mark camera 66 is a CCD (charge-coupled device) camera including a matrix of CCDs defining an image-take surface.

As shown in FIGS. 2 and 3, two reflecting mirrors 70, 71 each as a reflecting device are fixed to the X-axis slide 34 via respective brackets (not shown). One reflecting mirror 70 has a first reflecting surface 72 which is inclined, right below a path of movement of the mounting head 60 in the Y-axis direction, by about 45 degrees relative to a vertical plane including the centerline (i.e., axis line) of the suction nozzle 62, and whose lower end is nearer to the X-axis slide 34 than an upper end thereof. The other reflecting mirror 71 has a second reflecting surface 73 which is provided on the other side of the X-axis slide 34 that is opposite to the one reflecting mirror 70, such that the second reflecting surface 73 is symmetrical with the first reflecting surface 72 with respect to a vertical plane and a lower end of the second surface 73 is nearer to the X-axis slide 34 than an upper end thereof. The two reflecting mirrors 70, 71 are provided at a position right above one of the two ball screws 40, such that the two mirrors 70, 71 are located between the feeder-type EC supplying device 20 and the board positioning and supporting device or the printed board 16. The reflecting first surface 72 is defined by a half mirror which reflects a major portion of a light that is incident thereto in a downward direction from the mounting head 60 and which transmits the entire portion of a light that is incident thereto in an upward direction.

An EC camera 74 which takes images of the EC 28 held by the suction nozzle 62 is fixed to the X-axis slide 34, such that the EC camera 74 is opposed to the second reflecting surface 73 of the second reflecting mirror 71, on the other side of the X-axis slide 34 that is opposite to the mounting head 60. The EC camera 74 is a CCD camera and cooperates with the two reflecting mirrors 70, 71 to provide an EC-image taking device 76.

A front light 84 is attached to the X-axis slide 34 via an attaching member (not shown), at a position right below the first reflecting surface 72 of the first reflecting mirror 70. The front light 84 includes a printed board 86, a number of light emitting diodes 88 which are fixed to the printed board 86, and a diffusion plate 89 which covers the diodes 88 and takes a horizontal posture. The front light 84 emits light upward at the EC 28 held by the suction nozzle 62, so that the EC camera 74 takes an image of a front surface of the EC 28.

Figure 4:
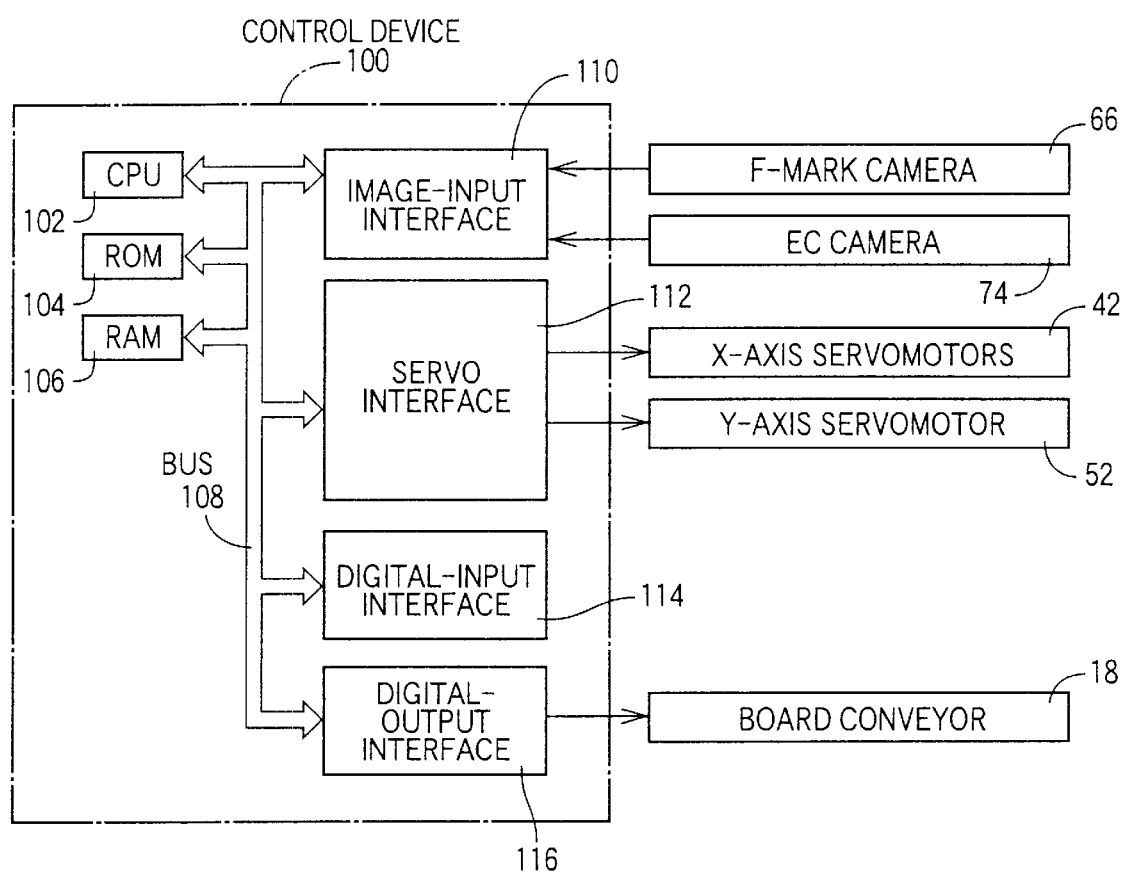
FIG. 4 is a diagrammatic view of a control device of the EC mounting system.

The present EC mounting system includes a control device 100 shown in FIG. 4. The control device 100 is essentially provided by a computer including a central processing unit (CPU) 102, a read only memory (ROM) 104, a random access memory (RAM) 106, and a bus 108 which couples those elements 102, 104, 106 to one another. An image-input interface 110 is coupled to the bus 118, and the F-mark and EC cameras 66, 74 are connected to the image-input interface 110. A servo interface 112 is also coupled to the bus 108, and the X-axis servomotors 42 and the Y-axis servomotor 52 are connected to the servo interface 112. In addition, a digital-input interface 114 is coupled to the bus 108, and the operation panel (not shown) is connected to the digital-input interface 114. Moreover, a digital-output interface 116 is coupled to the bus 108, and the board conveyor 18, the feeder-type and tray-type EC supplying devices 20, 22, and the EC mounting device 30 are connected to the digital-output interface 116.

The ROM 104 stores various control programs including a mounting program which is used by the computer to mount the ECs 28 on the printed board 16, and an image-data processing program and a modifying-data producing program which will be described later.

Next, the operations of the EC mounting system constructed as described above will be described. Since the EC mounting operation of the present system is described in detail in the above-indicated Japanese Patent No. 2,824,378, the EC mounting operation is just briefly described, and an image-data processing operation and a modifying-data producing operation of the present system are described in detail.

In the EC mounting operation, first, the X-axis slide 34 and/or the Y-axis slide 44 is/are moved to convey the mounting head 60 to the EC-supply position of the feeder-type or tray-type EC supplying device 20, 22 where the mounting head 60 or the suction nozzle 62 holds one EC 28 supplied by the supplying device 20, 22. After the suction nozzle 62 is lowered and is contacted with the EC 28, a negative air pressure is supplied to the nozzle 62 so that the nozzle 62 sucks and holds the EC 28, and subsequently the nozzle 62 is moved upward.

The mounting head 60 or the suction nozzle 62 holding the EC 28 is moved, along a straight line connecting between the EC-supply position of the EC supplying device 20 and a prescribed EC-mount place on the printed board 16, from the EC-supply position toward the EC-mount place. During this movement, the mounting head 60 passes over the first reflecting mirror 70 that is fixed to the X-axis slide 34 at the position between the EC-supply position and the EC-mount place. Wherever the EC-supply position may be on the feeder-type EC supplying device 20, or wherever the EC-mount place may be on the printed board 16, the mounting head 60 needs to move in the Y-axis direction on the X-axis slide 34 and pass over a portion of the slide 34 located between the supplying device 20 and the printed board 16, for moving from the EC-supply position to the EC-mount place. Therefore, the mounting head 60 must pass over the first reflecting mirror 70 fixed to that portion of the slide 34 located between the supplying device 20 and the printed board 16.

During this movement, the light which forms the silhouette image of the EC 28 in the light background created by the back light 63, or the light which forms the image of the front surface of the EC 28 exposed to the light emitted by the front light 84, is reflected in a horizontal direction by the first reflecting surface 72 and then is reflected upward by the second reflecting surface 73. When the mounting head 60 or the suction nozzle 62 passes over the first reflecting mirror 70, the EC 28 held by the nozzle 62 passes over the first reflecting surface 72. Meanwhile, the EC camera 74 is fixed at the position above the second reflecting surface 73. Thus, the image-forming light is incident to the image-take surface (i.e., the CCD matrix) of the EC camera 74, and the EC camera 74 takes an image of the EC 28 held by the suction nozzle 62.

In the present embodiment, even if the size of the EC 28 may be so large that the EC camera 74 cannot take, at once, a whole image of the EC 28, the image-taking device 76 can provide an accurate whole image of the EC 28, by taking a plurality of (e.g., five) part images from a plurality of parts of the EC 28, respectively, and synthesizing or integrating the five part images into the single whole image. While the mounting head 60 or the suction nozzle 62 holding the EC 28 is passing through an image-take station right above the first reflecting surface 72 of the first reflecting mirror 70, the head 60 is stopped each time the head 60 is moved by a predetermined regular distance or pitch in a predetermined range corresponding to the image-take station, so that each time the head 60 is stopped, the EC camera 74 takes an image of a corresponding one of the five parts of the EC 28. The time of exposure of the EC camera 74 to the image-forming light is controlled by an electronic shutter which is provided by the control device 100. The electronic shutter or the control device 100 controls the EC camera 74 in such a manner that after an image formed on the image-take surface (i.e., CCD matrix) of the camera 74, i.e., respective electric charges charged in the image-taking elements (i.e., CCDs) of the same 74 are erased, the image-take surface is exposed to the image-forming light for a predetermined time so that an image newly formed on the surface is obtained as a batch of part-image data by the control device 100.

For example, an EC 28 having a Y-axis-direction dimension of about 150 mm are imaged five times by the EC camera 74 which has a field of view whose Y-axis-direction dimension corresponds to about 40 mm on the EC 28, while the EC 28 is moved relative to the camera 74 in the Y-axis direction.

The above-indicated regular first distance or pitch at which the mounting head 60 is intermittently moved and stopped within the predetermined range of the image-take station, is predetermined such that the first regular distance or pitch is equal to the product of a natural number and a second regular distance or pitch at which a plurality of reference marks 172, described later, are arranged, in a matrix, on a standard substrate 170 (FIG. 7), and such that each of the five part images taken by the camera 74 images a corresponding one of the five parts of the EC 28 and includes an overlapping portion imaging a portion of another part of the EC 28 that is adjacent to that one part in the EC 28. In the present embodiment, the first regular distance is equal to 35 mm, and a Y-axis-direction width of each of the respective overlapping portions of the five (strictly, four) part images is equal to 5 mm. The five parts of the EC 28 are ordered from the first part to the fifth part in the Y-axis direction. Therefore, the Y-axis-direction length of the total range imaged by the five-time operations of the EC camera 74 is equal to 180 mm (=40 mm×5−5 mm×4). The width of each of the four overlapping portions may be not shorter than twice a Y-axis-direction length of a pixel area (e.g., 0.1 mm×0.1 mm) corresponding to each of the image-taking elements (i.e., CCDs) of the EC camera 74 and, for example, may be equal to about 10 times that length.

However, the first regular distance may not be equal to the product of the second regular distance of the reference marks 172 and the natural number, so long as the first regular distance is a constant value. The first regular distance may be equal to about 37 mm or about 33 mm.

Figure 5:
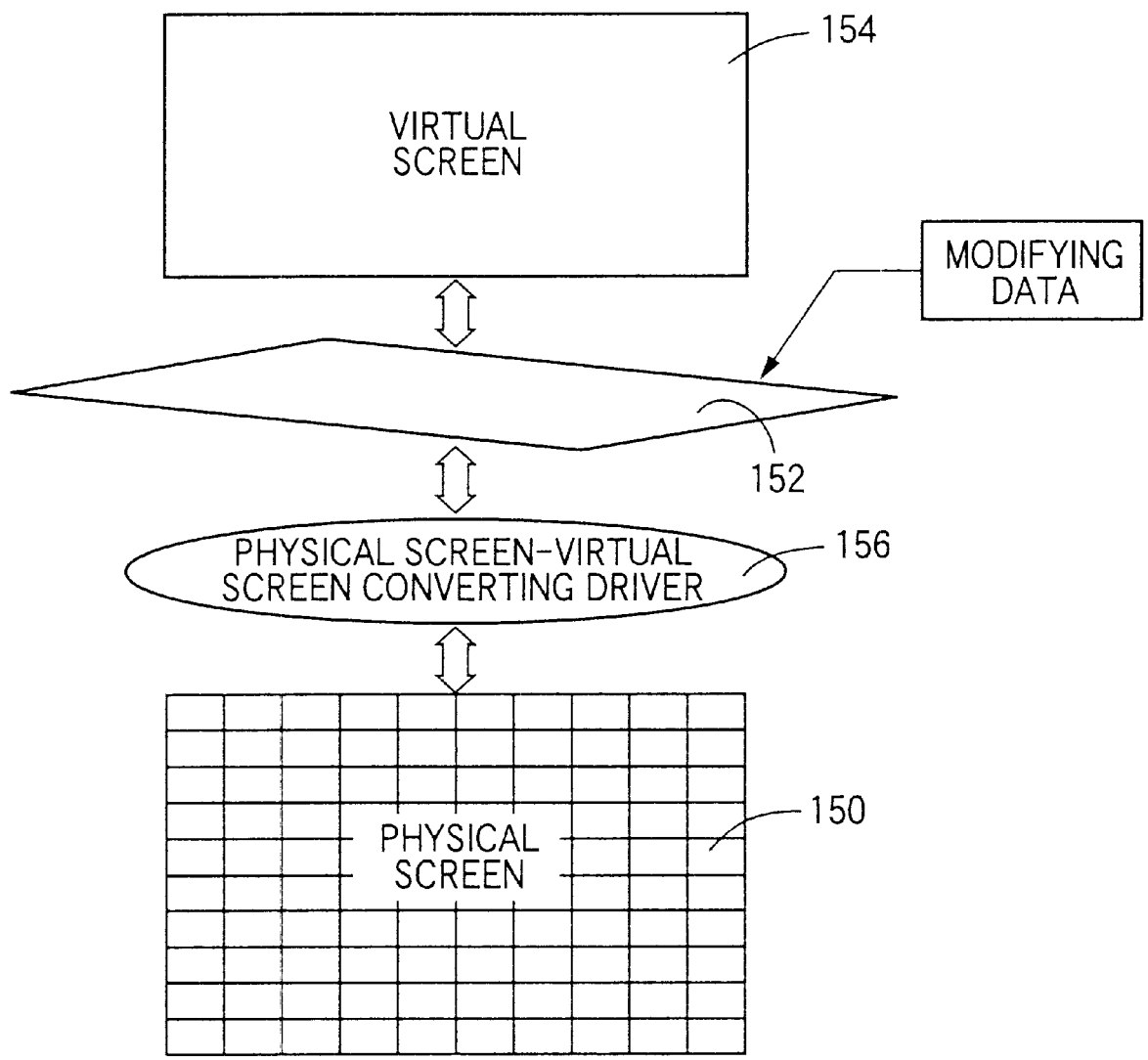
FIG. 5 is a view for explaining a manner in which the control device produces image data of a virtual screen from image data of a physical screen.

As shown in FIG. 5, the control device 100 produces, based on the five batches of part-image data representing the five parts of the EC 28, five physical screens 150 (only one screen 150 is shown in FIG. 5), respectively. In addition, the control device 100 produces a virtual screen 154 corresponding to the five parts of the EC 28 and having a Y-axis-direction dimension, 180 mm, equal to that of the above-indicated total range imaged by the five-time operations of the EC camera 74. Modifying data 152 which are stored in the RAM 106 of the control device 100 associate an arbitrary virtual position on the virtual screen 154, with a corresponding physical position on a corresponding one of the five physical screens 150, while taking into account the four overlapping portions. However, the EC-part image on each of the five physical screens 150 has a distortion corresponding to that of the CCD matrix of the EC camera 74, and has an angular-phase error relative to the Y-axis direction, corresponding to that of the field of view of the EC camera 74 about its optical axis. Therefore, if the five EC-part images on the five physical screens 150 are simply connected to each other on the single virtual screen 154 while taking into account the overlapping portions, the thus obtained whole image of the EC 28 would not have an accurate shape or accurate dimensions. Hence, image-data modifications are needed to remove the influences of the above-indicated distortion of the CCD matrix, and angular-phase error of the view field, of the EC camera 74. The control device 100 carries out, according to the image-data-processing program, described later, those modifications by utilizing the modifying data 152, which associates a virtual set of X and Y coordinates indicating an arbitrary virtual position on the virtual screen 154, with a physical set of X and Y coordinates indicating a corresponding physical position on a corresponding one of the five physical screens 150.

Based on the five batches of EC-part-image data obtained by the five-time operations of the EC camera 74, the control device 100 examines the EC 28 held by the suction nozzle 62 and determines positional errors (e.g., parallel-position errors and an angular-phase error) of the EC 28. For example, in the case where the EC 28 is a quad flat package (QFP) having a number of lead wires, a front image of the QFP is taken by using the front light 84 and the EC camera 74, and the control device 100 determines, based on the taken image, the total number of the lead wires of the QFP, judges whether any one of the lead wires is bent, and judges whether there is an error with a regular pitch at which the lead wires are arranged. Based on the thus obtained results, the control device 100 finally judges whether the QFP should pass the examination. If the QFP is judged as one which should pass the examination, then the control device 100 determines the positional errors of the QFP and, after modifying those errors, mounts the QFP on the printed board 16.

Figure 12:
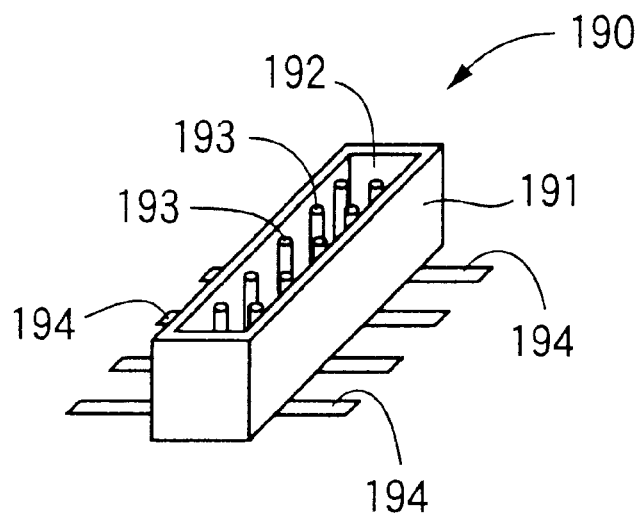
FIG. 12 is a view of a connector as an object.
Figure 13:
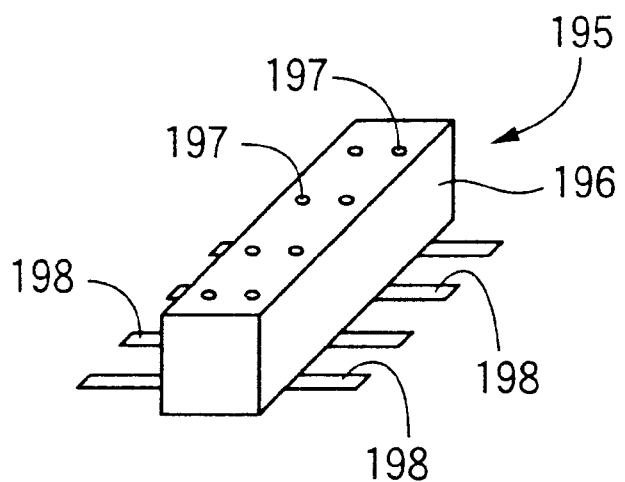
FIG. 13 is a view of another connector as another object.
Figure 14:
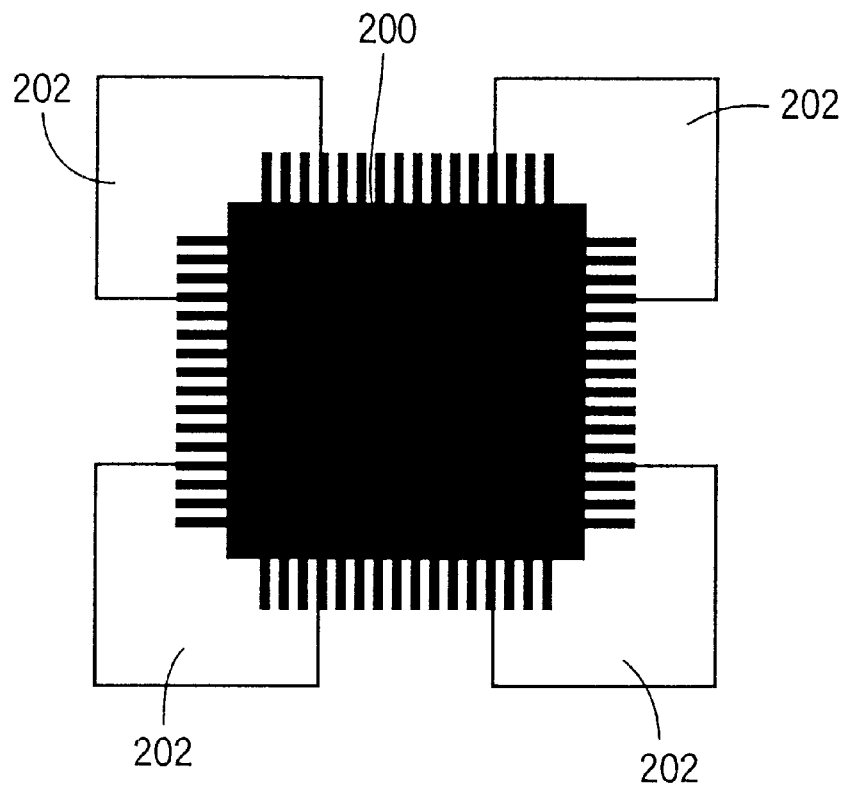
FIG. 14 is a view for explaining a conventional image-data processing method.

The EC 28 may be a connector 190 shown in FIG. 12, or a connector 195 shown in FIG. 13. The first connector 195 includes a container-like main body 191 having a parallelepiped shape, and is mounted on the printed board 16 such that an opening 192 faces upward. The first connector 195 additionally includes a plurality of pins 193 which extend upward from the bottom of the main body 191 such that the pins 193 do not project out of the opening 192. Moreover, a plurality of lead wires 24 are attached to a bottom wall of the main body 191. The second connector 195 includes a hollow main body 196 having a parallelepiped shape and having, in a top wall thereof, a plurality of through-holes 197 communicating with an inner vacant space, and is mounted on the printed board 16 such that the through-holes 197 face upward. A plurality of lead wires 198 are attached to a bottom wall of the main body 196.

The examination of the EC 28 (e.g., the QFP or the connector 190, 195) and the determination of the positional errors of the same need to determine respective positions of the lead wires of the EC 28. To this end, the control device 100 processes the five batches of EC-part-image data in the same manner as that disclosed in U.S. Pat. No. 5,754,677, except for the above-mentioned modifications carried out between the single virtual screen 154 and the five physical screens 150. More specifically described, the control device 100 reads out, from the ROM 104, seek-line data representing a plurality of seek lines which are prescribed on the virtual screen 154 and which are needed to examine the lead wires of the EC 28. Respective points where the seek lines intersect an edge line (or an outline) of the image of each lead wire are obtained as "edge" points, and a position of a center of the each lead wire is determined based on respective sets of X and Y coordinates indicating the edge points. More specifically described, a physical screen-virtual screen converting driver 156 which is provided by the control device 100 modifys, based on the modifying data 152, the position of each point on each seek line on the virtual screen 154 and thereby determines a position of a corresponding point on a corresponding one of the five physical screens 150. The control device 100 determines, on the one physical screen 150, four pixel areas neighboring the thus determined position of the corresponding point, and obtains respective optical characteristic values associated with the four neighboring pixel areas on the one physical screen 150. The control device 100 calculates, by applying interpolation to the thus obtained four optical characteristic values, an optical characteristic value for the determined position of the corresponding point. Finally, the control device 100 determines the optical characteristic value for the determined position on the one physical screen 150, as an optical characteristic value for the each point on the each seek line on the virtual screen 154.

Concurrently with the above-explained processing of the five batches of EC-part-image data, the control device 100 operates for moving the mounting head 60 or the suction nozzle 62 holding the EC 28 to a position right above an EC-mount place on the printed board 16 and subsequently lowering the nozzle 62 to mount the EC 28 on the EC-mount place. Thus, one EC 28 is mounted on the board 16. However, if the control device 100 judges, as the result of above-described examination, that the EC 28 should not pass the examination and should not be mounted on the board 16, because the EC 28 is of an erroneous sort or is defective, the control device 100 operates for moving the mounting head 60 to a predetermined EC-discard position where the EC 28 is discarded.

Next, there will be described, the image-data processing operation of the EC mounting system.

Figure 6:
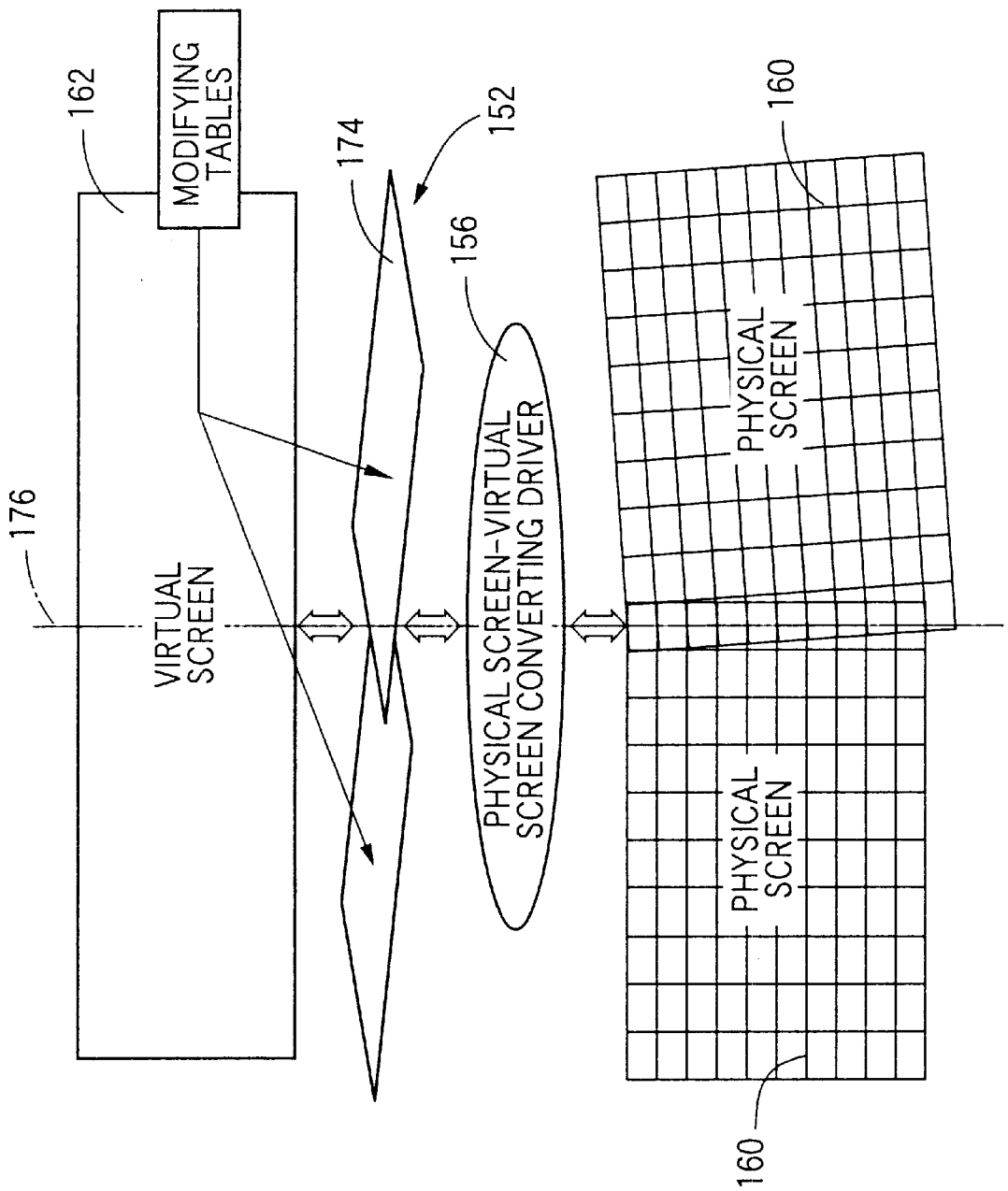
FIG. 6 is a view for explaining a method in which the control device produces modifying data.

The control device 100 carries out the image-data processing operation, according to the image-data processing program which is stored in the ROM 104. However, before the image-data processing program is explained, the modifying-data producing program which is also stored in the ROM 104 and is used to produce the modifying data 152 so as to be used in the image-data processing program will be described first. The control device 100 produces, according to the modifying-data producing program, the modifying data 152 which include modifying amounts for modifying errors between virtual sets of X and Y coordinates indicating virtual positions on a single virtual screen 162 corresponding to five parts of a standard substrate 170, and physical sets of X and Y coordinates indicating physical positions on five physical screens 160 (only two physical screens 160 are shown in FIG. 6) which are defined by five batches of part-image data representing five part images taken from the five parts of the substrate 170.

Figure 7:
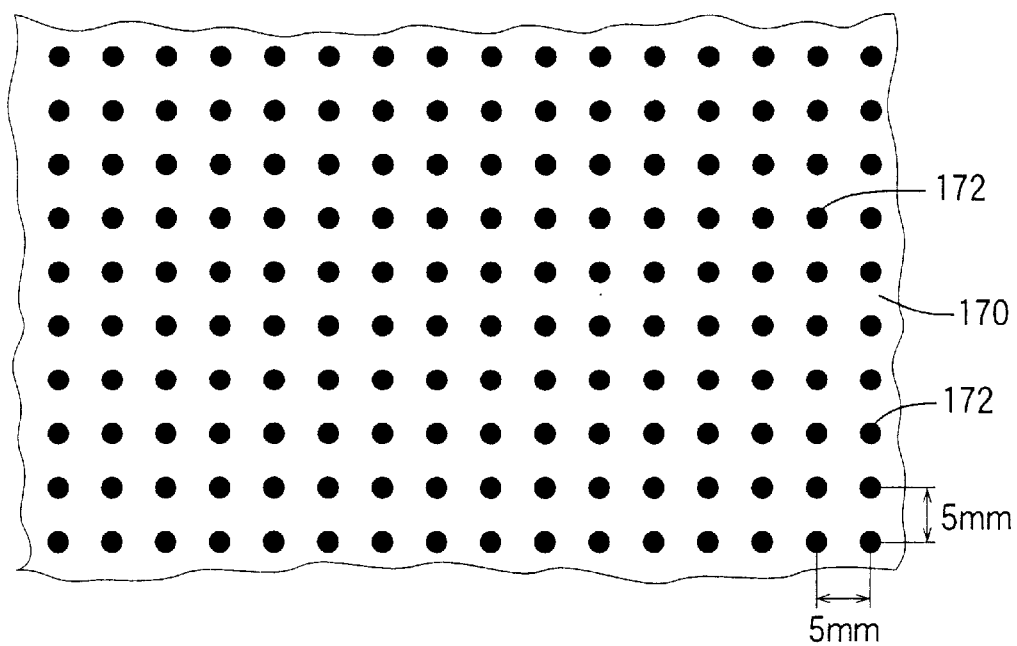
FIG. 7 is a plan view of a standard substrate which is used when the control device carries out a modifying-data producing program.

As shown in FIG. 7, the standard substrate 170 (only a part thereof is shown) has, on a surface thereof, a number of reference marks 172 arranged in a matrix. The EC camera 74 takes the five part images from the five parts of the substrate 170, and produces the five batches of part-image data representing the five part images of the substrate 170. Like the EC 28, the standard substrate 170 is sucked and held by the suction nozzle 62, and the respective images of the five parts of the substrate 172 are taken at five stop positions of the head 60 by the EC camera 74. The control device 100 produces the five physical screens 160, based on the five batches of substrate-part-image data representing the five substrate-part, images, and determines respective physical sets of X and Y coordinates indicating the physical positions of the reference marks 172 present on each of the five physical screens 160. Moreover, the control device 100 determines respective positional errors between the thus determined physical sets of X and Y coordinates indicating the physical positions of the reference marks 172, and corresponding prescribed sets of X and Y coordinates indicating respective prescribed positions of the reference marks 172 on the virtual screen 162, and determines, based on the thus determined positional errors, the modifying data 152. Hereinafter, the modifying-data producing program will be described in more detail, below.

When an operator inputs, through the operation panel, a command to prepare the modifying data 152, the control device 100 operates for moving the suction nozzle 62 to take the standard substrate 170 from a substrate holder (not shown). Since the standard substrate 170 is held by the substrate holder such that the substrate 170 is accurately positioned relative to the holder, the suction nozzle 62 can hold the substrate 170 such that there is substantially no parallel-position error or angular-phase error of the substrate 170 relative to the nozzle 62. Thus, when the mounting head 60 is stopped at each of the five stop positions, the reference marks 172 are positioned very accurately at respective prescribed positions. The standard substrate 170 has the reference marks 172 all over a reference range corresponding to the total range which is imaged by the five image-taking operations of the EC camera 74 that are to be carried out, to take the five part images from the EC 28. The reference marks 172 are located, on respective lattice points defined by a plurality of first straight lines parallel to each other and a plurality of second straight lines parallel to each other and perpendicular to the first straight lines, so that each of the five part images taken from the five parts of the substrate 170 may include an odd number of reference marks 172 along each of the first straight lines, and an odd number of reference marks 172 along each of the second straight lines. When the five part images of the substrate 170 are taken, the first and second straight lines are made parallel to the X-axis and Y-axis directions of the EC mounting system, respectively. In the present embodiment, each of the reference marks 172 consists of a black circle, and the reference marks 172 are arranged, both along the first straight lines and along the second straight lines, at a common regular interval or pitch which is equal to twice the diameter of each black circle. In the example shown in FIG. 7, each reference mark 172 consists of a black circle having a diameter of about 2.5 mm, and the common regular distance or pitch between the respective centers of each pair of adjacent reference marks 172 is about 5.0 mm, i.e., twice the diameter of 2.5 mm. The standard substrate 170 is provided by a quartz glass having a small linear thermal-expansion coefficient on which the reference marks 172 are printed. Thus, the remaining or background portion of the substrate 172, other than the reference marks 172, is colorless and transparent.

The color of each reference mark 172 is not limited to the black color, but may be any color so long as it has a luminance or a hue different from that of its background. The diameter of each reference mark 172 and/or the common regular pitch may be changed; for example, the diameter of each mark 172 may be about 3.5 mm and the common pitch may be about 7.0 mm. In addition, a first regular pitch at which the reference marks 172 are arranged along the first straight lines may differ from a second regular pitch at which the reference marks 172 are arranged along the second straight lines. The shape of each reference mark 172 may be any shape, such as square, rectangle, triangle, ellipse, or cross.

The substrate holder may be provided at a position adjacent to the feeder-type EC supplying device 20. In this case, it is preferred that the standard substrate 170 be taken out from the substrate holder, like the ECs 28 taken out from the EC feeders 24, and be returned to the holder after the five image-taking operations of the EC camera 74. Alternatively, it is possible that the standard substrates 170 be supplied, one by, one from the substrate holder, like the ECs 28 supplied by the EC feeders 24, and be discarded to a substrate collecting box after the five image-taking operations of the camera 74. In either case, when the mounting head 60 or the suction nozzle 62 holding the standard substrate 170 passes over the first reflecting mirror 70, the EC camera 74 takes the five part images from the five parts of the substrate 170, respectively, in the same manner as the above-described manner in which the five part images of the EC 28 are taken by the EC camera 74. Based on the five batches of substrate-part-image data representing the thus taken five substrate-part images, the control device 100 produces the five physical screens 160 corresponding to the five substrate-part images, and produces five modifying tables 174 corresponding to the five physical screens 160, respectively. Next, there will be described the manner in which the five modifying tables 174 are prepared.

The five physical screens 160 include one main screen and four auxiliary screens. In the present embodiment, the middle one of the five screens 160 that corresponds to the middle one of the five parts of the standard subject 170 is selected as the main screen, and the four screens on both sides of the middle screen are selected as the auxiliary screens. The main modifying table 174 corresponding to the main physical screen 160 is so produced as to contain modifying data to modify the distortion of the main part image caused by the properties of the image-taking device 76, and the angular-phase error of the middle part image caused by that of the EC camera 74 about its optical axis. Each of the other, four auxiliary modifying tables 174 corresponding to the four auxiliary physical screens 160 is so produced as to contain modifying data to modify the distortion of the corresponding auxiliary part image caused by the properties of the image-taking device 76 itself, the angular-phase error of the corresponding auxiliary part image caused by that of the EC camera 74 about its optical axis, and the parallel-position errors of the corresponding auxiliary part image relative to the main part image. In addition, the control device 100 produces distortion modifying data to modify the image distortion caused by the properties of the image-taking device 76 itself, for the following reasons:

In the present embodiment, the single EC camera 74 takes the five part images from the EC 28 or the standard substrate 170. Therefore, it can be assumed that the image distortion as the errors caused by the properties (e.g., the distortion of the CCD matrix) of the image-taking device 76 itself is substantially common to the five part images taken from the five parts of the EC 28 or the substrate 170. Based on this assumption, it can be made easier to update the five modifying tables 174. The angular-phase error of the EC camera 74, and the parallel-position errors of each of the four auxiliary screens 160 relative to the main screen 160 may change by the temperature change, time-wise change, and/or adjustment of the EC mounting system. However, the image distortion caused by the properties of the image-taking device 76 itself will not change till the EC camera 74 is replaced with another camera. Therefore, once the control device 100 produces a distortion-modifying table as the distortion modifying data, the control device 100 does not update the distortion-modifying table, as a general rule, while updating the modifying data needed to modify the angular-phase error of the main part image, or each auxiliary part image, caused by that of the EC camera 74, and the parallel-position errors of each auxiliary part image relative to the main part image. Based on the thus updated control data and the unchanged distortion-modifying table, the control device 100 can easily update the five modifying tables 174.

As described previously, the suction nozzle 62 holds the standard substrate 170 at its accurate parallel positions in the X-axis and Y-axis directions and at its accurate angular phase about its axis line perpendicular to the X-Y coordinate plane defined by the X and Y axes. However, the accuracy with which the nozzle 62 holds the substrate 170 is not so high as the level of μm. That is, the present EC mounting system allows such parallel-position and angular-phase errors in terms of μm. Therefore, the respective positions of the reference marks 172 present on each of the main and auxiliary physical screens 160 contain, in addition to the errors caused by the image distortion and/or the screen positional errors as the parallel-position and angular-phase errors among the main and auxiliary physical screens 160, the errors with which the nozzle 62 holds the substrate 170. The latter errors are caused by the parallel-position and angular-phase errors of the substrate 170 relative to the nozzle 62, and are substantially common to the five physical screens 160. Therefore, first, the control device 100 determines, based on the respective physical positions of the reference marks 172 present on each of the five physical screens 160, a corresponding mark-coordinate-error table including both the errors caused by the image distortion and/or the screen positional errors and the errors with which the nozzle 62 holds the substrate 170, and then applies, to each of the thus determined five mark-coordinate-error tables, a common coordinate transformation which removes, from the each mark-coordinate-error table, only the errors with which the nozzle 62 holds the substrate 170. Thus, the errors of the respective physical positions of the reference marks 172 that are caused by the errors with which the nozzle 62 holds the substrate 170, can be 25 removed in the following manner, and the five modifying tables 174 corresponding to the five physical screens 160 are produced:

First, the control device 100 produces a mark-coordinate-error table corresponding to each of the five physical screens 160, such that the mark-coordinate-error table associates the prescribed sets of X and Y coordinates indicating the respective prescribed positions of the reference marks 172 on the virtual screen 162 corresponding to the five parts of the substrate 170, with respective mark-coordinate errors of the respective physical sets of X and Y coordinates indicating the respective physical positions of the reference marks 172 present on the each physical screen 160, relative to the respective prescribed sets of X and Y coordinates indicating the respective prescribed positions of the reference marks 172 on the virtual screen 162.

Figure 8:
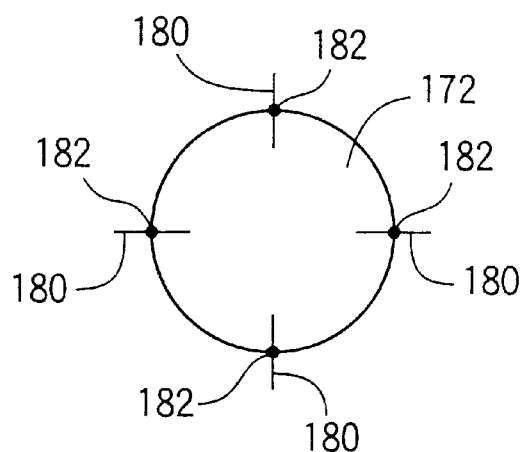
FIG. 8 is a view of a plurality of seek lines which are used when the control device carries out the modifying-data producing program.

To this end, first, the control device 100 determines an physical set of X and Y coordinates indicating each of the respective physical positions of the reference marks 172 present on each of the five physical screens 160 defined by the five batches of substrate-part-image data obtained by the five-time image-taking operations of the EC camera 74. Each batch of substrate-part-image data includes a number of luminance values which are respectively detected by the image-taking elements (i.e., the CCDs) arranged in the matrix in the EC camera 74, and are associated with respective positions of the CCDs in the matrix. The luminance values are a sort of optical characteristic values of the standard substrate 170. Each physical screen 160 is defined by the luminance values arranged as the matrix of pixel areas corresponding to the matrix of CCDs. In the present embodiment, each luminance value is expressed in terms of 256 steps. Alternatively, each luminance value may be expressed in terms of binary values or steps. In the present embodiment, since the reference marks 172 are black and their background is colorless and transparent, positions where respective amounts of change of the luminance values are greater than a threshold value can be determined as "edge" positions, i.e., a boundary between each reference mark 172 and its background. As shown in FIG. 8, positions where seek lines 180 intersect the edge positions can be determined as "edge" points 182, and a set of X and Y coordinates indicating the position of center of each reference mark 172 is determined based on respective sets of X and Y coordinates indicating the respective positions of the edge points 182. The thus determined set of X and Y coordinates indicating the position of center of each reference mark 172 is obtained as an physical set of X and Y coordinates indicating the physical position of each reference mark 172 on each physical screen 160. In the present embodiment, it is assumed that luminance values continuously change on the virtual screen 162, and the physical screen-virtual screen converting driver 156 determines a luminance value associated with an arbitrary virtual position on the virtual screen 162. Therefore, the physical sets of X and Y coordinates indicating the physical positions of the reference marks 172 can be accurately determined on each of the five physical screens 160.

Next, the control device 100 carries out a carpet or blanket pattern matching in which the device 100 compares the physical sets of X and Y coordinates on each of the five physical screens 160, with the corresponding prescribed sets of X and Y coordinates indicating the respective ideal or prescribed positions of the reference marks 172 on the virtual screen 162, and thereby determines the positional errors between the physical sets of X and Y coordinates and the corresponding prescribed sets of X and Y coordinates. More specifically described, the control device 100 seeks an physical set of coordinates in a predetermined area which has, at its center, each prescribed set of coordinates and, if the device 100 finds the physical set, it determines the found physical set as the physical set corresponding to the each prescribed set and produces data which associates the physical set with the each prescribed set. However, if the control device 100 cannot find, for at least one prescribed set of coordinates, an physical set of coordinates corresponding to the one prescribed set, in a predetermined area which has, at its center, the one prescribed set, the device 100 judges that the current modifying-data producing operation is erroneous, and ceases it.

Meanwhile, when the control device 100 have found the physical sets of coordinates for all the prescribed sets of coordinates, the device 100 produces, for each of the physical screens 160, a mark-coordinate-error table which associates each of the prescribed sets of coordinates with the corresponding mark-coordinate errors as amounts of error between the each prescribed set of coordinates and the corresponding physical set of coordinates.

The reason why the above-indicated carpet pattern matching is carried out is as follows: If the suction nozzle 62 holds the standard substrate 170 with sufficiently high positional accuracy and accordingly the positional errors of the substrate 170 relative to the mounting head 60 fall within permissible-error ranges, the control device 100 can produce highly reliable modifying data 152 based on five batches of substrate-part images which are obtained from the substrate 170 being held by the nozzle 62 under that condition. However, if the nozzle 62 holds the substrate 170 at a position and/or an angular phase which are largely deviated from a prescribed position and/or a prescribed angular phase, and if the control device 100 produces modifying data 152 under that condition, then the modifying data produced may not be so reliable. Hence, in the present embodiment, when at least one physical set of coordinates for at least one reference mark 172 is so largely deviated from a corresponding one prescribed set of coordinates that, as described above, the control device 100 cannot find the one physical set in a predetermined area which has, at its center, the one prescribed set, the device 100 ceases the current modifying-data producing operation. In addition, when the control device 100 finds, on any one of the five physical screens 160, an even number of reference marks 172 along any one of the above-described first and second straight lines, the device 100 also judges that the current operation is erroneous and ceases it. Thus, the carpet pattern matching assures that the control device 100 produces the modifying data 152 only in the case where the substrate 170 being positioned at almost modify position and angular phase is imaged five times.

The mark-coordinate errors associated with each of the prescribed sets of coordinates, obtained as described above, contain, in addition to (a) the image distortion caused by the properties of the image-taking device 76 itself, (b) a common angular-phase error, $\gamma$, of the five physical screens 160, i.e., the angle of inclination of the EC camera 74 relative to the Y-axis direction in which the Y-axis slide 44 is moved, and (c) the parallel-position errors of each of the auxiliary physical screens 160 relative to the main physical screen 160, (d) parallel-position errors and an angular-phase error, $\beta$, of the standard substrate 170 held by the suction nozzle 62.

Figure 9:
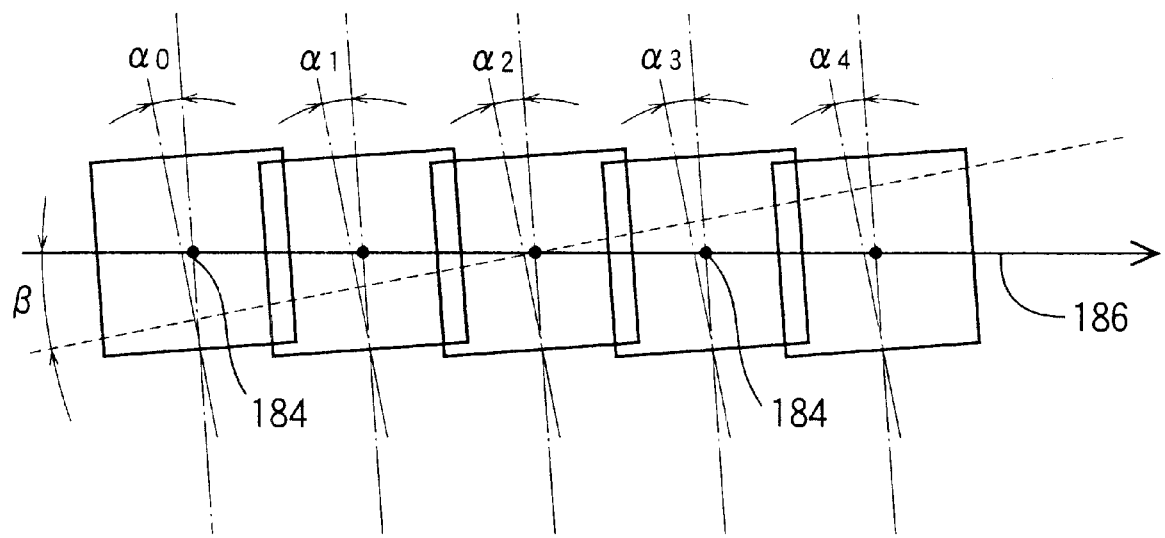
FIG. 9 is a view for explaining a step of the method in which the control device produces the modifying data.

Hence, first, the control device 100 assumes that there are no parallel-position errors or angular-phase error $\beta$ of the standard substrate 170 held by the suction nozzle 62, and calculates, from the mark-coordinate-error table corresponding to each of the five physical screens 160, X-axis-direction and Y-axis-direction parallel-position errors of the center of the each physical screen 160 relative to the virtual screen 160, and an angular-phase error, $\alpha_0$, $\alpha_1$, $\alpha_2$, $\alpha_3$, $\alpha_4$, of the each physical screen 160 relative to the virtual screen 160, as illustrated in FIG. 9. More specifically described, the control device 100 determines average mark-coordinate errors of all the mark-coordinate errors associated with all the prescribed sets of coordinates belonging to the mark-coordinate-error corresponding to each physical screen 160, and obtains the thus determined average mark-coordinate errors as two parallel-position errors of the each physical screen 160 relative to the virtual screen 160. Alternatively, it is possible to obtain or determine each of the two parallel-position errors of each physical screen 160, by first selecting at least one reference mark 172 located around the center of the each screen 160, as at least one representative mark of the each screen 160, and utilizing at least one set of mark-coordinate errors associated with the at least one representative mark.

The respective angular-phase errors $\alpha_0$, $\alpha_1$, $\alpha_2$, $\alpha_3$, $\alpha_4$ of the five physical screens 160 relative to the virtual screen 160 are calculated as follows: First, the control device 100 calculates, for the columns of prescribed sets of coordinates, or rows of prescribed sets of coordinates, in each of the five mark-coordinate-error tables (in the present embodiment, for the rows of prescribed sets of coordinates), respective angles of inclination of the respective rows of physical sets of coordinates relative to the corresponding rows of pre-scribed sets of coordinates, calculates an average of the thus determined angles of inclination, and obtains the thus calculated average angle as an angular-phase error $\alpha_0$, $\alpha_1$, $\alpha_2$, $\alpha_3$, $\alpha_4$ of each of the five physical screens 160. In fact, the control device 100 selects, from each row of prescribed sets of coordinates, a plurality of prescribed sets of coordinates which are positioned symmetrically with each other with respect to the middle prescribed set of coordinates, calculates a temporary inclination angle based on the mark-coordinate errors associated with each of the thus selected prescribed sets of coordinates, and determines an average of the respective temporary inclination angles determined for the selected prescribed sets of coordinates, as an inclination angle of the row of physical sets of coordinates corresponding to the each row of prescribed sets of coordinates, relative to the latter row. Finally, the control device 100 determines an average of the respective inclination angles determined for all the rows of physical sets of coordinates, as the angular-phase error $\alpha_0$, $\alpha_1$, $\alpha_2$, $\alpha_3$, $\alpha_4$ of each of the five physical screens 160.

In addition, the control device 100 determines a linear regression line 186 for respective centers 184 of the five physical screens 160, and determines an angle of inclination of the regression line 186 as an angle indicating the angular-phase error $\beta$ of the standard substrate 170 held by the suction nozzle 62. To this end, it is theoretically required that respective sets of X and Y coordinates corresponding to the respective centers of the five screens 160 be calculated. In fact, however, it can be assumed that the physical distance or pitch between the respective centers of each pair of adjacent physical screens 160 in the five screens 160 is equal to the regular distance or pitch (i.e., a nominal head-movement distance) at which the mounting head 60 is intermittently moved and stopped, five times, within the image-take station, for the five image-taking operations of the EC camera 74, and that an amount of deviation of the center 184 of each physical screen 160 from the Y-axis direction (i.e., the locus of movement of the head 60) is equal to the X coordinate of the set of X and Y coordinates indicating the center 184 of the each physical screen 160. Thus, the linear regression line 186 can be determined for the thus obtained, respective X coordinates of the respective centers 184 of the five physical screens 160. Then, the control device 100 calculates a difference between the angular-phase error $\beta$ of the substrate 170 held by the nozzle 62, i.e., the inclination angle of the regression line 186, and an average, $\alpha$, of the respective angular-phase angles $\alpha_0$, $\alpha_1$, $\alpha_2$, $\alpha_3$, $\alpha_4$ of the five physical screens 160, determines the thus calculated difference as the angular-phase error (i.e., inclination angle) $\gamma$ of the view field (i.e., image-take surface or CCD matrix) of the EC camera 74 relative to the Y-axis direction in which the Y-axis slide 44 is moved, and stores the thus determined angular-phase error $\gamma$ in the RAM 106. However, the control device 100 may determine, in place of the inclination angle of the linear regression line 186, (a) an average of respective inclination angles of four straight lines each of which passes through the center 184 of one of the five screens 160 and a corresponding one of the respective centers 184 of the other, four screens 160, or (b) an inclination angle of a straight line which passes through the respective centers 184 of two representative screens 160 out of the five screens 160, as the angular-phase error $\beta$ of the substrate 170 held by the nozzle 62.

Moreover, the control device 100 calculates an average of respective X-axis-direction and Y-axis-direction (i.e., parallel-position) errors of the respective centers 184 of the five physical screens 160, as parallel-position errors of the standard substrate 170 held by the suction nozzle 62. Then, the control device 100 subjects the mark-coordinate-error table corresponding to the main physical screen 160, to such a coordinate transformation which zeroes the parallel-position errors of the substrate 170, the parallel-position errors of the center 184 of the main physical screen 160, the angular-phase error β of the substrate 170 held by the nozzle 62, and the angular-phase error γ of the EC camera 74 relative to the Y-axis direction, and thereby produces a distortion-modifying table which associates each of the prescribed sets of coordinates with mark-coordinate errors caused by the image distortion only.

This distortion-modifying table may be directly used.

However, in the present embodiment, the control device 100 determines modifying points, at a regular interval of 0.5 mm, along each of the first and second straight lines, so as to interpolate the prescribed sets of coordinates indicating the respective prescribed positions of the reference marks 172 on the virtual screen 162, produces a final distortion-modifying table which associates each of the thus determined modifying points with corresponding mark-coordinate errors caused by the image distortion only, and stores the final distortion-modifying table in the RAM 106.

Then, the control device 100 subjects the thus obtained distortion-modifying table to such a coordinate transformation which adds the angular-phase error γ of the EC camera 74 relative to the Y-axis direction, and thereby produces a modifying table 174 corresponding to the main physical screen 160.

Next, the control device 100 subjects the respective positional errors of the respective centers 184 of the four auxiliary physical screens 160 to such a coordinate transformation which zeroes the differences between the positional errors of the standard substrate 170 held by the suction nozzle 62 and the positional errors of the center of the main physical screen 160, and the angular-phase error β of the substrate 170 held by the nozzle 62, thereby produces screen-relative-position modifying data for modifying the positional errors of each of the four auxiliary screens 160 relative to the main screen 160, and stores the screen-relative-position modifying data in the RAM 106. Moreover, the control device 100 subjects the distortion-modifying table to such a coordinate transformation which adds the screen-relative-position modifying data and the angular-phase error γ0 of the EC camera 74 relative to the Y-axis direction, and thereby produces four modifying tables 174 corresponding to the four auxiliary screens 160.

The control device 100 may stophysicall the thus obtained five modifying tables 174, in the RAM 106, and use them as needed. However, this manner needs the RAM 106 having a great memory capacity. In fact, in the present embodiment, the RAM 106 having a small memory capacity is employed, and only the distortion-modifying table, the angular-phase error γ of the EC camera 74, and screen-relative-position modifying data are stored in the RAM 106. Each time an arbitrary point is designated on the virtual screen 162, the control device 100 reads, from the distortion-modifying table, four modifying amounts corresponding to four modifying points neighboring the designated point, and subjects the thus read four modifying amounts to such a coordinate transformation which adds the angular-phase error γ of the EC camera 74, to provide four modifying amounts for use with the main physical screen 160, or read, from the distortion-modifying table, four modifying amounts corresponding to four modifying points neighboring the designated point, and subjects the thus read four modifying amounts to such a coordinate transformation which adds the angular-phase error γ of the EC camera 74 and the positional errors of each of the four auxiliary screens 160 relative to the main screen 160, to provide four modifying amounts for use with the each auxiliary physical screen 160. Thus, the combination of the distortion-modifying table and the angular-phase error γ of the EC camera 74 provides the modifying table 174 for use with the main screen 160; and the combination of the distortion-modifying table, the angular-phase error γ of the EC camera 74, and the positional errors of each of the four auxiliary screens 160 relative to the main screen 160 provides the modifying table 174 for use with the each auxiliary screen 160.

Figure 11:
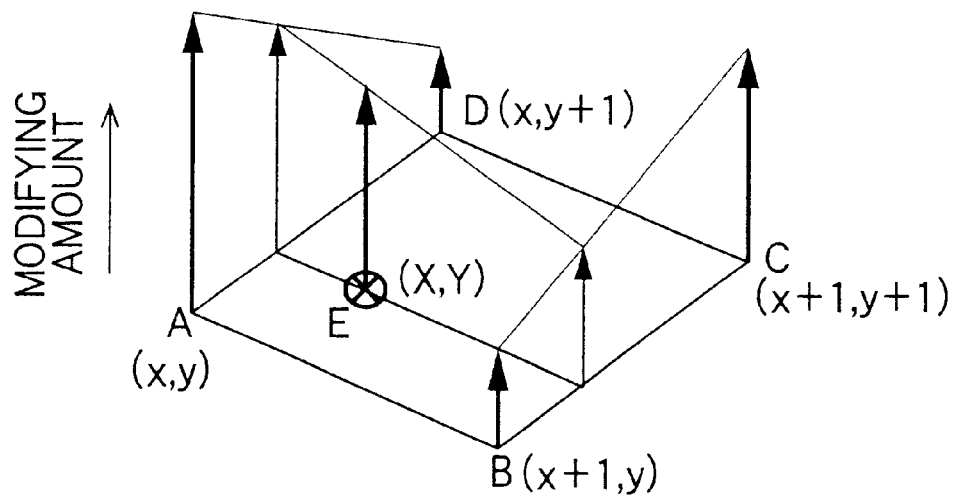
FIG. 11 is a view for explaining linear interpolation by which the control device calculates a modifying amount corresponding to a set of coordinates designated on the virtual screen.

Each of the five modifying tables 174 includes, for each of the prescribed sets of X and Y coordinates indicating the prescribed positions of the reference marks 172 on the virtual screen 162, a modifying amount for the X coordinate and a modifying amount for the Y coordinate. FIG. 11 shows a manner in which the control device 100 calculates a modifying amount for an X coordinate of an arbitrary virtual set of X and Y coordinates, based on the respective modifying amounts for respective X coordinates of four prescribed sets of X and Y coordinates neighboring the arbitrary virtual set of X and Y coordinates. In the present embodiment, each of the five modifying tables 174 includes, for each of the modifying points determined from the prescribed sets of X and Y coordinates, a modifying amount for the X coordinate of the each modifying point and a modifying amount for the Y coordinate of the same. Since, in the present embodiment, the parallel-direction and angular-phase errors are obtained as errors of each of the five physical screens 160 relative to the virtual screen 162, those errors can be utilized as modifying amounts which are directly used in the subsequent image-processing operation.

It merges from the foregoing description that in the present embodiment, the five modifying tables 174 are prepared by removing, from the five mark-coordinate-error tables, the parallel-direction and angular-phase errors of the standard substrate 170 held by the suction nozzle 62. However, in the case where an accuracy required for a subsequent measurement of positional errors of each EC 28 held by the nozzle 62 is at such a level which allows the parallel-direction and angular-phase errors of the substrate 170 held by the nozzle 62, or in the case where it is not needed to measure the parallel-direction and angular-phase errors of each EC 28 held by the nozzle 62 and it is just required to inspect whether each EC 28 is defective, the control device 100 may directly use the five mark-coordinate-error tables, as the five modifying tables 174. In the latter case, too, it is preferred to interpolate the respective modifying amounts associated with the prescribed sets of coordinates for the reference marks 172 provided at the regular interval of 5 mm or 7 mm, and thereby determine respective modifying amounts associated with modifying points provided at a shorter regular interval of, e.g., 0.5 mm, so that each of the five modifying tables 174 associates a set of X and Y coordinates indicating the position of each of the modifying points, with a corresponding set of modifying amounts.

Next, there will be described the image-data processing program according to which the control device 100 obtains a whole image of each of ECs 28. This program is for synthesizing or integrating, based on a plurality of EC-part-image data representing a plurality of EC-part images taken from a plurality of parts of the each EC28 and the above-described modifying data 152, the whole image of the each EC 28. However, the ECs 28 may include an EC 28 whose image can be taken at once by the EC camera 74, and the control device 100 may synthesize a single larger-part image of an EC 28 from a plurality of smaller-part images of the same 28.

The control device 100 produces, according to the image-data processing program, the single virtual screen 154 corresponding to the five parts of the EC 28, and reads out, from the ROM 104, seek-line data representing seek lines which are prescribed, on the virtual screen 154, for seeking the EC 28. The seek lines are so prescribed that each of the seek lines intersects the boundary or outline of the image of the EC 28. Since the seek lines are described in detail in the previously-indicated U.S. Pat. No. 5,754,677, the detail description is incorporated herein by reference and no additional description is provided.

In the present embodiment, the control device 100 designates a plurality of virtual sets of X and Y coordinates points indicating a plurality of points arranged at a predetermined small regular interval along each of the seek lines, and determines, using the physical screen-virtual screen converting driver 156, an optical characteristic value associated with a physical set of coordinates corresponding to each of the thus designated virtual sets of coordinates, on one of the five physical screens 150 that corresponds to the each virtual set of coordinates. Thus, the control device 100 can determine a shape, dimensions, positions, etc., of the EC 28, while keeping the amount of calculations needed, to a low level.

First, the control device 100 selects one of the five physical screens 150 that corresponds to each virtual set of coordinates designated on the virtual screen 154. More specifically described, the control device 100 determines one of respective image numbers, 0, 1, 2, 3, and 4, respectively allotted to the five physical screens 150, that corresponds to the Y coordinate of the each virtual set of coordinates. The control device 100 defines an X-Y coordinate plane whose origin coincides with the center of the virtual screen 154, and locates four boundary lines 176 (one boundary line 176 is shown in FIG. 6), each parallel to the Y axis, at respective positions apart from the origin by 1.5 time, 0.5 time, −0.5 time, and −1.5 time the regular distance or pitch at which the mounting head 60 is intermittently moved and stopped, five times, within the image-take station for the five image-taking operations of the EC camera 74. The control device 100 determines between which boundary lines 176 the Y coordinate of the each set of virtual set of coordinates falls, and thereby selects a corresponding one of the respective image numbers 0 to 4 of the five physical screens 150. The image number 2 designates the main physical screen 150, and the other four image numbers 0, 1, 3, 4 designates the four auxiliary physical screens 150, respectively.

If the image number corresponding to the Y coordinate is 2, the control device 100 determines modifying amounts corresponding to the virtual set of X and Y coordinates, based on the distortion-modifying table and the angular-phase error γ of the EC camera 74. On the other hand, if the image number is other than 2; the control device 100 reads out, from the RAM 106, the position-modifying data of one of the four auxiliary physical screens 150 that has the image number (i.e., the positional errors of the one auxiliary screen 150 from the main screen 150), and the angular-phase error γ of the EC camera 74, and determines modifying amounts corresponding to the virtual set of X and Y coordinates, based on the position-modifying data, the angular-phase error γ, and the distortion-modifying table. More specifically described, the control device 100 subjects modifying amounts associated with the virtual set of X and Y coordinates by the distortion-modifying table, to such a coordinate transformation which adds the positional errors of the one auxiliary screen 150 from the main screen 150) and the angular-phase error γ of the EC camera 74, so as to obtain final modifying amounts associated with the virtual set of coordinates.

As described above, the distortion-modifying table associates each of the modifying points arranged in the matrix at the regular interval of 0.5 mm along each of the columns and rows thereof, with a corresponding sets of modifying amounts. The control device 100 obtains, from the distortion-modifying table, four sets of modifying amounts associated with four modifying points neighboring the virtual set of coordinates.

In the present embodiment, it is assumed that the distortion of each physical image 150 is expressed by continuously changeable values, as shown in the graph of FIG. 10. The control device 100 selects, for the current virtual set of X and Y coordinates, E, four modifying points, A, B, C, and D, neighboring the virtual set E. Based on the four sets of modifying amounts (indicated at respective vectors directed upward, in FIG. 11) associated with the four modifying points A, B, C, D by the distortion-modifying table, the control device 100 calculates, by linear interpolation, the set of modifying amounts associated with the virtual set E. The thus calculated set of modifying amounts include a first modifying amount for the X coordinate of the virtual set E, and a second modifying amount for the Y coordinate of the same. Hereinafter, there will be described the manner in which the control device 100 calculates the first modifying amount for the X coordinate of the virtual set E, as a representative of the first and second modifying amounts.

FIG. 11 shows the virtual set of coordinates E (X, Y), and the four modifying points A (x, y), B (x+1, y), C(x, y+1), D (x+1, y+1) that neighbor the virtual point E and are used to interpolate the same E. Here, if it is assumed that the respective first modifying amounts associated with the four modifying points A, B, C, D are indicated by f (x, y), f (x+1, y), f (x, y+1), f (x+1, y+1), respectively, and that a difference between the respective X coordinates of the points E, A is indicated by a (=X−x) and a difference between the respective Y coordinates of the points E, A is indicated by b (=Y−y), the first modifying amount, f (X, Y), for the virtual point E is calculated according to the following expression (5):

$$F(X, Y)=f(x, y)(1-a)(1-b)+f(x+1, y)a(1-b)+f(x+1, y+1)ab+f(x, y+1)(1-a)b \qquad (5)$$

As to the Y coordinate of the virtual point E, the control device 100 calculates the second modifying amount therefore, in the same manner as described above. Thus, the control device 100 obtains the first and second modifying amounts for the virtual set of X and Y coordinates E. In addition, the control device 100 subjects the thus obtained two modifying amounts to a coordinate transformation which adds the angular-phase error γ of the EC camera 74 and/or the positional errors of each of the auxiliary physical screens 150 relative to the main physical screen 150, so as to obtain a set of modifying amounts for the virtual point E. The control device 100 modifys, based on the set of modifying amounts, the virtual set of X and Y coordinates E to determine a corresponding physical set of X and Y coordinates on a corresponding one of the five physical screens 150.

Next, based on the thus determined physical set of coordinates, the control device 100 determines an optical characteristic value corresponding to the virtual point E. The control device 100 reads out one of the five physical screens 150 that has the image number corresponding to the Y coordinate of the virtual point E, determines an optical characteristic value corresponding to the determined physical set of coordinates on the one physical screen 150, and obtains the optical characteristic value for the physical set of coordinates, as the optical characteristic value for the virtual point E. More specifically described, the control device 100 determines respective positions of four image-taking elements (i.e., four CCDs) neighboring the physical set of coordinates, and obtains respective optical characteristic values associated with the respective positions of the four image-taking elements. The respective positions of the image-taking elements correspond to respective image-take (i.e., pixel) areas defined by the elements. In the present embodiment, the respective positions of the image-taking elements correspond to respective centers of the pixel areas defined by the elements. The optical characteristic value associated with the position of each of the image-taking elements is just the value detected by the each element, and can be regarded as an average of optical characteristic values in the pixel area defined by the each element. Based on the thus obtained respective positions of the four image-taking elements neighboring the physical set of coordinates and the respective optical characteristic values associated with the respective positions of the four image-taking elements, the control device 100 calculates, by linear interpolation, an optical characteristic value corresponding to the virtual set of coordinates, in the same manner as described above for the calculation of the first and second modifying mounts for the virtual point E.

Thus, the control device 100 finishes its operation for obtaining an optical characteristic value corresponding to one virtual set of coordinates E. The control device 100 repeats this operation for all the virtual sets of coordinates designated on each of the seek lines and thereby obtains respective optical characteristic values corresponding to those virtual sets of coordinates. Then, the control device 100 evaluates the optical characteristic values thus obtained on the each seek line. More specifically described, the control device 100 determines a position where the optical characteristic values significantly largely change (e.g., a position where the rate of change takes a maximum or is greater than a reference value), as an "edge" point on the each seek line. Based on the respective edge points on the seek lines, the control device 100 can determine a shape, at least one dimension, at least one position, etc. of the EC 28.

In the present embodiment, the control device 100 produces the modifying data 152 including the distortion-modifying table to modify the distortion of each physical image 150 and the position-error-modifying data to modify the parallel-position and angular-phase errors of each of the physical screens 150, and applies the distortion-modifying table commonly to the five screens 150. Thus, the total amount of the modifying data 152 is reduced as such. In addition, since the image distortion is dealt with, independent of the positional errors of each physical screen 150, the control device 100 can update either the image distortion or the positional errors of each physical screen 150, independent of each other. For example, since the image distortion is caused by the properties of the image-taking device 76 itself and accordingly does not change as time elapses, the control device 100 may be adapted to update the image distortion only when the image-taking device is exchanged with another one, and regularly update only the modifying data to modify the parallel-position and angular-phase errors between the image-taking device and the EC holder 62. In the last case, the total amount of calculations carried out by the control device 100 can be reduced as compared with the case whephysicall the five modifying tables 174 are updated by the same 100, and the control device 100 is allowed to update more frequently the modifying data to modify the parallel-position and angular-phase errors between the image-taking device and the EC holder 62 and thereby improve the accuracy of measurement of shape, dimensions, and positions of the EC 28.

While the present invention has been described in its preferred embodiment, it is to be understood that the present invention may otherwise be embodied.

For example, in the illustrated embodiment, the EC camera 74 and the mounting head 60 are movable relative to each other in the Y-axis direction, but are not movable relative to each other in the X-axis direction. However, the EC mounting system may be modified such that the EC camera 74 and the mounting head 60 are movable relative to each other in both the Y-axis direction and the X-axis direction. In the latter case, the image-taking device 76 not only takes a plurality of part images from a plurality of parts of the EC 28 in the Y-axis direction but also takes a plurality of part images from a plurality of parts of the EC 28 in the X-axis direction, and provides the part images to arranged in a matrix including columns and rows.

In addition, in the illustrated embodiment, the EC mounting system employs the single EC camera 74 and uses the single camera 74 for sequentially taking a plurality of part images from a plurality of parts of the EC 28. However, the EC mounting system may employ a plurality of EC cameras for simultaneously taking a plurality of part images from a plurality of parts of the EC 28. In the latter case, the total number of the EC cameras may differ from that of the part images taken from the parts of the EC 28. For example, the EC mounting system may employ two EC cameras for simultaneously taking two part images out of a number of part images to be taken from a number of parts of the EC 28, and repeating this for taking all the part images from all the parts of the EC 28. In the last case, the total number of the image-taking operations of each of the two EC cameras is half the total number of the image-taking operations of the single EC camera 74. In addition, the time needed to take all the part images can be reduced.

In the illustrated embodiment, the image-taking device 76 includes the two reflecting mirrors 70, 71. However, it is possible to employ a different image-taking device. For example, the second reflecting mirror 71 is replaced with a half mirror, a third reflecting mirror is provided in the back of the half mirror, and another or second EC camera is provided such that the second EC camera is opposed to the third mirror. In this case, the two EC cameras may have different magnifying factors, so that one EC camera having the greater factor may be used to take images from a small-size EC 28 and the other EC camera having the smaller factor may be used to take images from a large-size EC 28. Alternatively, the two EC cameras may be simultaneously used to take two part images having the different magnifying factors, respectively.

It is to be understood that the present invention may be embodied with various other changes, modifications and improvements, such as those described in SUMMARY OF THE INVENTION, which may occur to a person skilled in the art without departing from the spirit and scope of the invention defined in the appended claims.

What is claimed is:

1. A method of processing a plurality of batches of object-part-image data representing a plurality of object-part images which are taken by at least one image-taking device from a plurality of parts of an object, respectively, and thereby obtaining at least one optical characteristic value of the object, the object-part images imaging the parts of the object such that at least one first object-part image images at least one first part and at least one second object-part image images at least one second part adjacent to said at least one first part in the object and includes at least one overlapping portion imaging a portion of said at least one first part, each of said plurality of batches of object-part-image data comprising a plurality of optical characteristic values respectively associated with a plurality of physical positions, and thereby defining a corresponding one of a plurality of physical screens, the method comprising the steps of designating at least one virtual position on a virtual screen corresponding to the parts of the object, modifying, based on predetermined modifying data, said at least one virtual position on the virtual screen, and thereby determining at least one physical position corresponding to said at least one virtual position, on one of the physical screens, and obtaining at least one optical characteristic value associated with said at least one physical position on said one physical screen, as at least one optical characteristic value associated with said at least one virtual position on the virtual screen and as said at least one optical characteristic value of the object.

2. A method according to claim 1, wherein the image-taking device includes a plurality of image-taking elements, said each batch of object-part-image data comprises the plurality of optical characteristic values which are, on said corresponding physical screen, associated with respective physical pixel areas corresponding to the plurality of image-taking elements of the image-taking device, and the modifying data comprise data which associate respective virtual pixel areas on the virtual screen, with the respective physical pixel areas, on each of the physical screens, that correspond to the image-taking elements, wherein the step of modifying said at least one virtual position comprises selecting, from the virtual pixel areas on the virtual screen, at least one virtual pixel area including said at least one virtual position, and determining, on said one physical screen, at least one physical pixel area corresponding to said at least one virtual pixel area, and wherein the step of obtaining said at least one optical characteristic value associated with said at least one physical position on said one physical screen comprises obtaining at least one optical characteristic value associated with said at least one physical pixel area on said one physical screen, as at least one optical characteristic value associated with said at least one virtual pixel area on the virtual screen.

3. A method according to claim 1, wherein the modifying data comprise a plurality of modifying tables each of which associates a plurality of prescribed sets of coordinates prescribed on the virtual screen, with a plurality of modifying amounts to modify said plurality of prescribed sets of coordinates and thereby determine, on a corresponding one of the physical screens, a plurality of physical sets of coordinates corresponding to said plurality of prescribed sets of coordinates, and wherein the step of modifying said at least one virtual position comprises determining, based on one of the modifying tables that corresponds to said one physical screen, at least one modifying amount corresponding to at least one virtual set of coordinates indicating said at least one virtual position on the virtual screen, and determining, based on said at least one modifying amount, at least one physical set of coordinates corresponding to said at least one virtual set of coordinates, on said one physical screen.

4. A method according to claim 3, wherein the step of determining said at least one modifying amount comprises determining said at least one modifying amount corresponding to said at least one virtual set of coordinates, based on said one modifying table which associates a plurality of neighboring prescribed sets of coordinates neighboring said at least one virtual set of coordinates on the virtual screen, with a plurality of modifying amounts to modify said plurality of neighboring prescribed sets of coordinates and thereby determine, on said one physical screen, a plurality of physical sets of coordinates corresponding to said plurality of neighboring prescribed sets of coordinates.

5. A method according to claim 3, wherein the image-taking device includes a plurality of image-taking elements, and said each batch of object-part-image data comprises the plurality of optical characteristic values which are, on said corresponding physical screen, associated with respective physical pixel areas corresponding to the plurality of image-taking elements of the image-taking device, and wherein the step of obtaining said at least one optical characteristic value associated with said at least one physical position on said one physical screen comprises obtaining at least one optical characteristic value associated with at least one physical pixel area including said at least one physical set of coordinates corresponding to said at least one virtual set of coordinates.

6. A method according to claim 3, wherein the image-taking device includes a plurality of image-taking elements, and said each batch of object-part-image data comprises the plurality of optical characteristic values which are, on said corresponding physical screen, associated with respective physical-pixel-related sets of coordinates indicating respective positions, in the image-taking device, of respective points representing the plurality of image-taking elements, and wherein the step of obtaining said at least one optical characteristic value associated with said at least one physical position on said one physical screen comprises determining at least one optical characteristic value associated with said at least one physical set of coordinates corresponding to said at least one virtual set of coordinates, based on the physical-pixel-related sets of coordinates, and the optical characteristic values associated therewith, of said one physical screen.

7. A method according to claim 6, wherein the step of determining said at least one optical characteristic value associated with said at least one physical set of coordinates comprises determining said at least one optical characteristic value associated with said at least one physical set of coordinates, based on a plurality of neighboring physical-pixel-related sets of coordinates neighboring said at least one physical set of coordinates, and a plurality of optical characteristic values associated with the plurality of neighboring physical-pixel-related sets of coordinates, of said one physical screen.

8. A method according to claim 1, further comprising the step of determining, in advance, said one of the physical screens that is to be used to obtain said at least one optical characteristic value associated with said at least one physical position corresponding to said at least one virtual position.

9. A method according to claim 1, wherein the image-taking device includes a plurality of image-taking elements, and wherein the overlapping portion of the second object-part image has a width which is not smaller than twice a width of a physical pixel area corresponding to each of the image-taking elements.

10. A method according to claim 1, wherein the object comprises a connector.

11. An image-data processing system,
- at least one image-taking device which takes a plurality of object-part images from a plurality of parts of an object, respectively, the object-part images imaging the parts of the object such that at least one first object-part image images at least one first part and at least one second object-part image images at least one second part adjacent to said at least one first part and includes at least one overlapping portion imaging a portion of said at least one first part;
- an object-part-image-data memory which stores a plurality of batches of object-part-image data representing the plurality of object-part images taken by the image-taking device, each of the batches of object-part-image data comprising a plurality of optical characteristic values respectively associated with a plurality of physical positions, and thereby defining a corresponding one of a plurality of physical screens;
- a modifying-data memory which stores predetermined modifying data; and
- a virtual-data producing device which modifies, go based on the modifying data, at least one virtual position on a virtual screen corresponding to the parts of the object, and thereby determines at least one physical position corresponding to said at least one virtual position, on one of the physical screens, and which produces virtual data comprising said at least one virtual position which is, on the virtual screen, associated with at least one optical characteristic value which is, on said one physical screen, associated with said at least one physical position.

12. A system according to claim 11, wherein the virtual-data producing device modifies, based on the modifying data, at least one virtual set of coordinates representing said at least one virtual position, and thereby determines at least one physical set of coordinates corresponding said at least one virtual set of coordinates, and produces the virtual data comprising said at least one virtual set of coordinates which is, on the virtual screen, associated with said at least one optical characteristic value which is, on said one physical screen, associated with said at least one physical set of coordinates.

13. A method of predetermining the modifying data recited in claim 11, comprising the steps of:
- taking, with said at least one image-taking device, at least two substrate-part images from at least two parts of a substrate that correspond to said at least one first part and said at least one second part of the object, the substrate having a plurality of reference marks which are regularly provided on a surface thereof,
- obtaining at least two batches of substrate-part-image data representing said at least two substrate-part images, respectively, said at least two substrate-part images imaging said at least two parts of the substrate such that at least one first substrate-part image images at least one first part of the substrate and at least one second substrate-part image images at least one second part of the substrate adjacent to said at least one first part in the substrate and includes at least one overlapping portion imaging a portion of said at least one first part of the substrate, each of said at least two batches of substrate-part-image data defining a corresponding one of a plurality of physical screens, and
- producing, based said on at least two physical screens, and a virtual screen corresponding to said at least two parts of the substrate and having, thereon, respective prescribed positions of the reference marks of the substrate, the modifying data to modify each of respective physical positions of the reference marks on said at least two physical screens so as to coincide with a corresponding one of the prescribed positions of the reference marks on the virtual screen.

14. A method according to claim 13, wherein the step of producing the modifying data comprises producing the modifying data to modify a physical set of coordinates indicating said each of the respective physical positions of the reference marks on said at least two physical screens so as to coincide with a prescribed set of coordinates indicating said corresponding one of the prescribed positions of the reference marks on the virtual screen.

15. A method according to claim 14, wherein the step of producing the modifying data comprises producing a plurality of prescribed sets of coordinates indicating the prescribed positions of the reference marks on the virtual screen, and a plurality of modifying vectors respectively directed from the plurality of prescribed sets of coordinates to a plurality of physical sets of coordinates indicating the respective physical positions of the reference marks on said at last two physical screens, and producing at least two modifying tables each of which associates at least two prescribed sets of coordinates out of said plurality of prescribed sets of coordinates, with at least two modifying vectors out of said plurality of modifying vectors.

16. A method according to claim 15, wherein the step of taking said at least two substrate-part images comprises sequentially taking, with a single image-taking device as said at least one image-taking device, said at least two substrate-part images from said at least two parts of the substrate, and wherein the step of producing the modifying data comprises
- producing, based on at least one of said at least two modifying tables that corresponds to at least one of said at least two physical screens, image-distortion data representing a distortion of said at least one physical screen relative to the virtual screen, and
- producing positional-error data representing a positional error of each of said at least two physical screens relative to the virtual screen.

17. A method according to claim 16, wherein the step of producing the positional-error data comprises
- producing, based on the modifying vectors of each of said at least two modifying tables, parallel-position-error data representing a position error of a corresponding one of said at least two physical screens relative to the virtual screen in a direction parallel to the virtual screen, and
- producing, based on the modifying vectors of said each modifying table, angular-phase-error data representing an angular-phase error of said corresponding one physical screen relative to the virtual screen about an axis line perpendicular to the virtual screen.

18. A method according to claim 16, wherein the step of producing the positional-error data comprises producing, based on at least one error of at least one physical set of coordinates indicating the physical position of at least one representative reference mark of the reference marks on said each physical screen, relative to at least one prescribed set of coordinates indicating the prescribed position of said at least one representative reference mark on the virtual screen, parallel-position-error data representing a position error of said each physical screen relative to the virtual screen in a direction parallel to the virtual screen, and producing, based on said at least one error of said at least one physical set of coordinates indicating the physical position of said at least one representative reference mark on said each physical screen, relative to said at least one prescribed set of coordinates indicating the prescribed position of said at least one representative reference mark on the virtual screen, angular-phase-error data representing an angular-phase error of said each physical screen relative to the virtual screen about an axis line perpendicular to the virtual screen.

19. A method according to claim 16, wherein the step of producing the positional-error data further comprises determining, based on the positional-error data and at least one prescribed offset amount prescribed for said at least two physical screens, a physical offset amount between said at least two physical screens.

20. A method according to claim 19, wherein said at least two physical screens comprise a single main physical screen and at least one auxiliary physical screen, and wherein the step of determining the physical offset amount comprises determining a relative positional error of said at least one auxiliary physical screen relative to the main physical screen.

21. A method according to claim 20, wherein the step of obtaining said at least two batches of substrate-part-image data comprises obtaining at least three batches of substrate-part-image data representing at least three substrate-part images taken from at least three parts of the substrate, and defining at least three physical screens, respectively, and wherein said at least three physical screens comprise the main physical screen representing an middle one of said at least three substrate-part images taken from a middle one of said at least three parts of the substrate.

* * * * *